United States Patent
Minematsu

(10) Patent No.: US 10,623,176 B2
(45) Date of Patent: Apr. 14, 2020

(54) AUTHENTICATION ENCRYPTION METHOD, AUTHENTICATION DECRYPTION METHOD, AND INFORMATION-PROCESSING DEVICE

(71) Applicant: NEC CORPORATION, Tokyo (JP)

(72) Inventor: Kazuhiko Minematsu, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 494 days.

(21) Appl. No.: 15/504,886

(22) PCT Filed: Aug. 18, 2015

(86) PCT No.: PCT/JP2015/004099
§ 371 (c)(1),
(2) Date: Feb. 17, 2017

(87) PCT Pub. No.: WO2016/027454
PCT Pub. Date: Feb. 25, 2016

(65) Prior Publication Data
US 2017/0272239 A1 Sep. 21, 2017

(30) Foreign Application Priority Data
Aug. 20, 2014 (JP) ................. 2014-167424

(51) Int. Cl.
*H04L 9/06* (2006.01)
(52) U.S. Cl.
CPC .......... *H04L 9/0662* (2013.01); *H04L 9/0618* (2013.01); *H04L 9/0637* (2013.01); *H04L 9/0643* (2013.01)
(58) Field of Classification Search
CPC ... H04L 9/0618; H04L 9/0637; H04L 9/0643; H04L 9/0662
See application file for complete search history.

(56) References Cited

U.S. PATENT DOCUMENTS

| 7,046,802 B2 | 5/2006 | Rogaway |
| 7,418,100 B2 | 8/2008 | McGrew et al. |

(Continued)

FOREIGN PATENT DOCUMENTS

| JP | 64-010750 A | 1/1989 |
| JP | 10-303883 A | 11/1998 |

(Continued)

OTHER PUBLICATIONS

Morris Dworkin, "Recommendation for Block Ciper Modes of Operation: Galois/Counter Mode (GCM) and GMAC", NIST Special Publication 800-38D, Nov. 2007, Computer Security, pp. 1-31 [online], [retrieved on Oct. 28, 2015], Retrieved from the Internet, <URL: http://csrc.nist.gov/publications/nistpubs/800-38D/SP-800-38D.pdf>.

(Continued)

*Primary Examiner* — Trang T Doan
(74) *Attorney, Agent, or Firm* — Sughrue Mion, PLLC

(57) ABSTRACT

An information-processing device is provided with: a plaintext input unit for inputting plaintext; an initial vector generation unit for generating an initial vector; a common key block encryption unit for performing common key block encryption on the initial vector and generating an encrypted initial vector; a pseudorandom number generation unit which, accepting the encrypted initial vector as input, generates a pseudorandom number series in the same length as the plaintext; a keyed hash unit which, accepting the first portion of a ciphertext in which the pseudorandom number series and the plaintext are exclusive-OR'ed as input, generates a hash value; and a ciphertext output unit for concatenating the second and first portions of a ciphertext in which the hash value and the encrypted initial vector are exclusive-OR'ed and outputting the concatenated portions as a ciphertext.

12 Claims, 20 Drawing Sheets

(56) References Cited

U.S. PATENT DOCUMENTS

| | | | |
|---|---|---|---|
| 8,213,611 B2* | 7/2012 | Ungerboeck | H04L 25/03866 380/268 |
| 8,654,972 B2* | 2/2014 | Kiyomoto | H04L 9/0668 380/268 |
| 2002/0097868 A1* | 7/2002 | Watanabe | G06F 7/582 380/46 |
| 2007/0081668 A1 | 4/2007 | McGrew et al. | |
| 2008/0112561 A1 | 5/2008 | Kim et al. | |
| 2010/0067686 A1* | 3/2010 | Minematsu | H04L 9/0662 380/28 |
| 2012/0191984 A1 | 7/2012 | Ohyama | |

FOREIGN PATENT DOCUMENTS

| | | |
|---|---|---|
| JP | 2008-122967 A | 5/2008 |
| JP | 2011-91494 A | 5/2011 |
| JP | 2012-151805 A | 8/2012 |

OTHER PUBLICATIONS

Chae Hoon Lim, "Message Encryption and Authentication Using One-Way Hash Functions", Proc. of 3rd Annual Workshop on Selected Areas in Cryptology (SAC '96), Aug. 1996, pp. 1 to 11 [online], [retrieved on Oct. 28, 2015], retrieved from the Internet, <URL: http://citeseerx.ist.psu.edu/viewdoc/download?doi=10.1.1. 51.3421&rep=rep1&type=pdf>.

D. McGrew, Authenticated Encryption with Replay prOtection (AERO), Network Working Group, Internet-Draft, Oct. 15, 2013, https://tools.ietf.org/html/draft-mcgrew-aero-00.

International Search Report of PCT/JP2015/004099, dated Nov. 17, 2015. [PCT/ISA/210].

Written Opinion of PCT/JP2015/004099, dated Nov. 17, 2015. [PCT/ISA/237].

Communication dated Jun. 18, 2019, from the Japanese Patent Office in counterpart Application No. 2016-543814.

\* cited by examiner

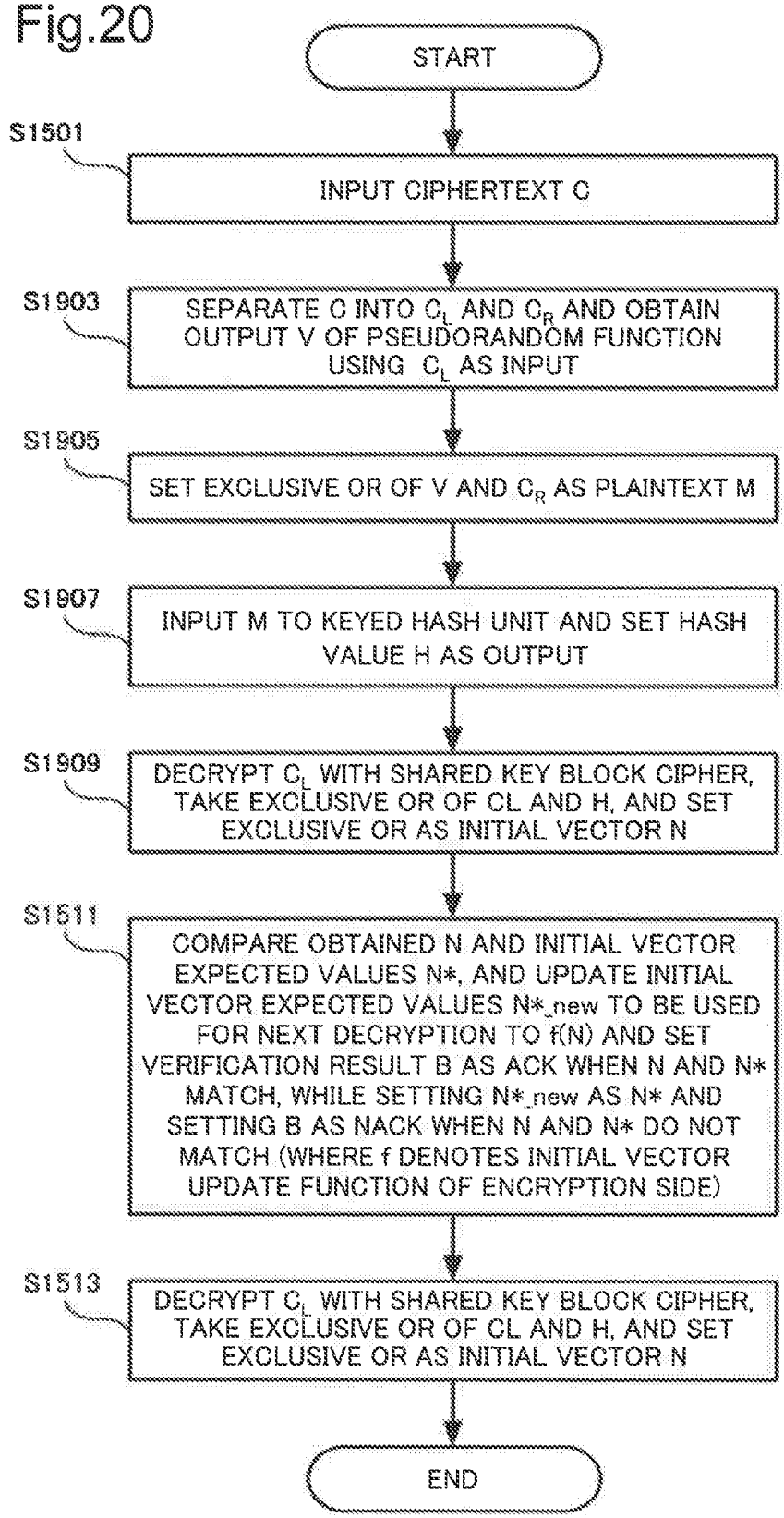

AUTHENTICATION ENCRYPTION METHOD, AUTHENTICATION DECRYPTION METHOD, AND INFORMATION-PROCESSING DEVICE

CROSS REFERENCE TO RELATED APPLICATIONS

This application is a National Stage of International Application No. PCT/JP2015/004099 filed Aug. 18, 2015, claiming priority based on Japanese Patent Application No. 2014-167424, filed Aug. 20, 2014, the contents of all of which are incorporated herein by reference in their entirety.

TECHNICAL FIELD

The present invention relates to an authenticated encryption method, an authenticated decryption method, an information processing device, a control program, and a storage medium storing the control program.

BACKGROUND ART

Various encryption techniques are known.

PTL 1 discloses an encryption method. In the encryption method, an operation of a block cipher mode, in which a block cipher with an arbitrary block length is implemented, provides output ciphertext always in the same size as that of input plaintext. The mode is capable of providing the best possible security in systems of disk-block cipher, some network protocols or the like in which data expansion is not allowed. The mode accepts an additional input which can be used to protect against attacks that falsify the ciphertext by rearranging the ciphertext blocks. The universal hash function from Galois/Counter Mode of operation for block ciphers may be used in an example embodiment for hardware and software efficiency.

PTL 2 discloses a data distribution device. The data distribution device is capable of detecting, in encrypted data, falsification of associated non-encrypted data and, when falsification is detected, disabling normal decryption of the encrypted data. When input data A and non-encrypted data B are input, the data distribution device performs block encryption on the input data A by the use of a hash value computed on the basis of the non-encrypted data B, and distributes encrypted data E(A) and the non-encrypted data B. The data distribution device includes data compression means, block encryption means, and data distribution means. The data compression means computes a hash value on the basis of the non-encrypted data B by the use of the hash function. The block encryption means performs the block encryption on the input data A in a predetermined use mode using the hash value as an initial vector, to thereby generate the encrypted data E(A). The data distribution means multiplexes the encrypted data E(A) generated by the block encryption means and the non-encrypted data B, and distributes a header, the non-encrypted data B, and the encrypted data E(A).

PTL 3 discloses an encryption method. The encryption method improves cipher strength by causing a change in plaintext to affect a wide range. The encryption method has the following configuration. First, in the encryption method, data encryption standard (DES) encryption is performed on an initial vector 1. Secondly, in the encryption method, the exclusive OR of the encrypted initial vector 1 and the first eight-byte small block is computed. Thirdly, in the encryption method, DES encryption is performed on the result. Fourthly, in the encryption method, the exclusive OR of the encrypted result and the next small block is computed. Then, fifthly, in the encryption method, by repeatedly and sequentially performing the same process 32 times, a forward chain process is performed on 256 bytes. Subsequently, sixthly, in the encryption method, the same chain process is performed backward. Seventhly, in the encryption method, DES encryption is performed on the last small block of the chain. Eighthly, in the encryption method, the exclusive OR of the result of the encryption and the first block at this stage is computed. Ninthly, in the encryption method, the entire 256 bytes are permutated on a byte-by-byte basis. Further, tenthly, in the encryption method, the above series of processes is carried out again with a different feedback position.

Authenticated encryption (AE) is a technique of performing encryption and calculation of falsification detection authentication tag at the same time for a plain text message by the use of a secret key shared in advance. By applying AE to a communication path, it is possible to make contents confidential against tapping and to detect unauthorized falsification, whereby the contents being communicated can be protected reliably.

In such a normal authenticated encryption scheme, it is necessary that an initial vector N and a tag T are transmitted, by being combined with the ciphertext C, together with ciphertext C, in addition to the ciphertext C that is encrypted plaintext M and has the same length as plaintext M has. Although each of the initial vector N and the tag T is represented by a short value of approximately 4 bytes to 32 bytes in a normal process, the increase of the communication band due to the addition of the initial vector N and tag T is unignorable, for example, in a case where the plaintext M is as short as the initial vector N and tag T. Such a case frequently occurs in wireless sensor network devices. Since a communication band is an important factor that affects power consumption in such a network, band reduction is an important problem.

When a message authentication function is newly added to a communication path in which encryption without any message authentication function has been performed, to implement an authenticated encryption function as a whole, a change in a protocol is sometimes required irrespective of message length. Such a case may encounter practical difficulty.

As a method of solving such a problem, there is Authenticated Encryption with Replay prOtection (AERO) described in NPL 1. AERO in NPL 1 is a technique in which, for an input (N, M) obtained by combining an initial vector N and plaintext M, $C=P\_K(N, M)$ is generated as an overall output through wide pseudorandom permutation (WPRP) $P\_K$ of variable-length input/output with K as a key. Here, "P_K" is a function having the key K as a parameter. The length of the ciphertext C is equal to the sum of the lengths of the initial vector N and the plaintext M. The decryption side obtains (N, M) by applying inverse permutation of P_K to the ciphertext C by the use of the shared key K, and determines whether authentication is correctly checked on the basis of whether the decrypted initial vector N matches an expected value.

To determine whether the decrypted initial vector N has the expected value, it is necessary that the decryption side knows in advance the initial vector N that the encryption side is to use. This is possible when the encryption side and the decryption side are synchronized in terms of update of the initial vector N. This is typically enabled by the encryption side storing the initial vector of the most recently transmitted normal ciphertext. This condition is natural in a case where the decryption side is required to detect and eliminate replay.

In NPL 1, the information that the encryption side has to transmit is only the ciphertext C. Since the length of the ciphertext C is equal to the sum of the lengths of the initial vector N and the plaintext M, the increase of the band due to the encryption corresponds to the initial vector N only. For this reason, the band corresponding to the tag T can be reduced in comparison with the above-described general authenticated encryption scheme. In addition, owing to the nature of WPRP, the plaintext obtained as a result of decrypting ciphertext excluding replay is randomized overall. This makes it difficult for attackers to perform such a control as to set the part originally including the initial vector, at a particular value, which reduces the probability of the initial vector N having the value expected by the decryption side to a negligible extent.

Additionally, NPL 1 suggests to use, as WPRP, a block cipher use mode called the eXtended CodeBook (XCB) mode disclosed in PTL 1.

CITATION LIST

Patent Literature

PTL 1: U.S. Pat. No. 7,418,100
PTL 2: Japanese Unexamined Patent Application Publication No. 2011-091494
PTL 3: Japanese Unexamined Patent Application Publication No. H10-303883

Non Patent Literature

NPL 1: D. McGrew, Authenticated Encryption with Replay prOtection (AERO), https://tools.ietf.org/html/draft-mcgrew-aero-00

SUMMARY OF INVENTION

Technical Problem

However, the techniques described in the above-described background art literature have a problem of having low encryption efficiency. For example, in the technique described in PTL 1 above, three-pass encryption is configured for plaintext M of m blocks in the XBC mode in the case of 128-bit-block-based split. In the first pass and the last pass, GHASH is executed, which is polynomial hash over Galois field (GF) ($2^{128}$). In the intermediate pass, counter mode encryption with a 128-bit block cipher is performed. Hence, the load is higher than that of normal encryption. Specifically, it is needed that block encryption be performed once, and multiplication over GF ($2^{128}$) be performed twice, per input block. In other words, the increase of band due to authenticated encryption is reduced, but at the same time the efficiency in encryption is lowered.

The present invention aims to provide a technique efficiently enabling authenticated encryption with a small increase of band (length) of ciphertext with respect to plaintext.

Solution to Problem

In order to achieve the object described above, an information processing device according to an exemplary aspect of the present invention includes:

plaintext input means for inputting plaintext;
initial vector generation means for generating an initial vector;
shared key block encryption means for generating an encrypted initial vector by performing shared key block encryption on the initial vector;
pseudorandom number generation means for generating a pseudorandom number sequence having same length as the plaintext has using the encrypted initial vector as an input;
keyed hash means for generating a hash value using, as an input, a first part of ciphertext obtained by taking an exclusive OR of the pseudorandom number sequence and the plaintext; and
ciphertext output means for combining and outputting, as ciphertext, a second part of the ciphertext obtained by taking an exclusive OR of the hash value and the encrypted initial vector and the first part.

In order to achieve the object described above, a non-transitory computer readable storage medium according to an exemplary aspect of the present invention stores an information processing device control program causing a computer to execute:

a plaintext input step of inputting plaintext;
an initial vector generation step of generating an initial vector;
a shared key block encryption step of generating an encrypted initial vector by performing shared key block encryption on the initial vector;
a pseudorandom number generation step of generating a pseudorandom number sequence having same length as the plaintext has using the encrypted initial vector as an input;
a keyed hash step of generating a hash value by using, as an input, a first part of ciphertext obtained by taking an exclusive OR of the pseudorandom number sequence and the plaintext; and
a ciphertext output step of combining and outputting, as ciphertext, a second part of the ciphertext obtained by taking an exclusive OR of the hash value and the encrypted initial vector and the first part.

In order to achieve the object described above, an information processing device according to an exemplary aspect of the present invention includes:

plaintext input means for inputting plaintext;
initial vector generation means for generating an initial vector;
keyed hash means for generating a hash value using the plaintext as an input;
shared key block encryption means for generating a second part of ciphertext by performing shared key block encryption on a masked initial vector obtained by taking an exclusive OR of the initial vector and the hash value;
pseudorandom number generation means for generating a pseudorandom number sequence having same length as the plaintext has using the second part as an input; and
ciphertext output means for combining and outputting, as ciphertext, a first part of the ciphertext obtained by taking an exclusive OR of the pseudorandom number sequence and the plaintext and the second part.

In order to achieve the object described above, a non-transitory computer readable storage medium according to an exemplary aspect of the present invention stores an information processing device control program causing a computer to execute:

a plaintext input step of inputting plaintext;
an initial vector generation step of generating an initial vector;

a keyed hash step for generating a hash value using the plaintext as an input;

a shared key block encryption step of generating a second part of ciphertext by performing shared key block encryption on a masked initial vector obtained by taking an exclusive OR of the initial vector and the hash value;

a pseudorandom number generation step of generating a pseudorandom number sequence having same length as the plaintext has using the second part as an input; and a ciphertext output step of combining and outputting, as ciphertext, a first part of the ciphertext obtained by taking an exclusive OR of the pseudorandom number sequence and the plaintext and the second part.

In order to achieve the object described above, an information processing device according to an exemplary aspect of the present invention includes:

ciphertext input means for inputting ciphertext, separating the ciphertext into a first part and a second part, and outputting the first part and the second part;

keyed hash means for generating a hash value using the first part as an input;

pseudorandom number generation means for generating a pseudorandom number sequence having same length as the first part has using, as an input, an encryption initial vector obtained by taking an exclusive OR of the hash value and the second part of the ciphertext;

shared key block decryption means for generating an initial vector by performing shared key block decryption on the encrypted initial vector;

initial vector check means for inputting the decrypted initial vector and initial vector expected values, and checking whether the decrypted initial vector and the initial vector expected values match; and plaintext output means for outputting plaintext obtained by taking an exclusive OR of the pseudorandom number sequence and the first part when the decrypted initial vector and the initial vector expected values match.

In order to achieve the object described above, a non-transitory computer readable storage medium according to an exemplary aspect of the present invention stores an information processing device control program causing a computer to execute:

a ciphertext input step of inputting ciphertext, separating the ciphertext into a first part and a second part, and outputting the first part and the second part;

a keyed hash step of generating a hash value using the first part as an input;

a pseudorandom number generation step of generating a pseudorandom number sequence having same length as the first part has using, as an input, an encryption initial vector obtained by taking an exclusive OR of the hash value and the second part;

a shared key block decryption step of generating an initial vector by performing shared key block decryption on the encrypted initial vector;

an initial vector check step of inputting the generated initial vector and initial vector expected values, and checking whether the decrypted initial vector and the initial vector expected values match; and a plaintext output step of outputting plaintext obtained by taking an exclusive OR of the pseudorandom number sequence and the first part when the decrypted initial vector and the initial vector expected values match.

In order to achieve the object described above, an information processing device according to an exemplary aspect of the present invention includes:

ciphertext input means for inputting ciphertext, separating the ciphertext into a first part and a second part, and outputting the first part and the second part;

pseudorandom number generation means for generating a pseudorandom number sequence having same length as the first part has using the second part as an input;

shared key block decryption means for generating a masked initial vector by performing shared key block decryption on the second part;

keyed hash means for generating a hash value using, as an input, plaintext obtained by taking an exclusive OR of the pseudorandom number sequence and the first part;

initial vector check means for inputting a decrypted initial vector obtained by taking an exclusive OR of the hash value and the masked initial vector and initial vector expected values, and checking whether the decrypted initial vector and the initial vector expected values match; and plaintext output means for outputting the plaintext when the decrypted initial vector and the initial vector expected values match.

In order to achieve the object described above, a non-transitory computer readable storage medium according to an exemplary aspect of the present invention stores an information processing device control program causing a computer to execute:

a ciphertext input step of inputting ciphertext, separating the ciphertext into a first part and a second part, and outputting the first part and the second part;

a pseudorandom number generation step of generating a pseudorandom number sequence having same length as the first part has using the second part as an input;

a shared key block decryption step of generating a masked initial vector by performing shared key block decryption on the second part;

a keyed hash step of generating a hash value using, as an input, plaintext obtained by taking an exclusive OR of the pseudorandom number sequence and the first part;

an initial vector check step of inputting a decrypted initial vector obtained by taking an exclusive OR of the hash value and the masked initial vector and initial vector expected values, and checking whether the decrypted initial vector and the initial vector expected values match; and a plaintext output step of outputting the plaintext when the decrypted initial vector and the initial vector expected values match.

In order to achieve the object described above, an authenticated encryption method according to an exemplary aspect of the present invention, which is an authenticated encryption method including generating ciphertext based on plaintext and an initial vector generated so as to be different from any past value, includes:

generating an encrypted initial vector by performing shared key block encryption based on the initial vector;

generating, based on the encrypted initial vector, a pseudorandom number an exclusive OR of which is to be taken with the plaintext, in order to generate a first part of the ciphertext from the plaintext; and generating, based on the plaintext, a keyed hash value an exclusive OR of which is to be taken with the initial vector, in addition to shared key block encryption of the initial vector in the generating the encrypted initial vector, in order to generate a second part of the ciphertext from the initial vector.

In order to achieve the object described above, an authenticated decryption method according to an exemplary aspect of the present invention, which an authenticated decryption method including decrypting, from ciphertext, plaintext on which the ciphertext is based and an initial vector used for generating the ciphertext, includes:

generating, in order to decrypt the plaintext from a first part of the ciphertext, a pseudorandom number an exclusive OR of which is to be taken with the first part, by using a second part of the ciphertext, performing shared key block decryption by using the second part of the ciphertext; and generating, by using the first part, a keyed hash value an exclusive OR of which is to be taken with the second part, in addition to shared key block decryption of the second part in the shared key block decryption, in order to decrypt the initial vector from the second part of the ciphertext.

Advantageous Effects of Invention

According to the present invention, it is possible to efficiently enable authenticated encryption with a small increase of band (length) of ciphertext with respect to plaintext.

BRIEF DESCRIPTION OF DRAWINGS

FIG. 20 is a flowchart illustrating an operation procedure of the authenticated decryption unit according to the third example embodiment.

DESCRIPTION OF EMBODIMENTS

Example embodiments of the present invention are illustratively described below in detail with reference to the drawings. Note that the components described in the following example embodiments are merely examples, and the technical scope of the present invention is not intended to be limited only to those.

First Example Embodiment

Figure 1:
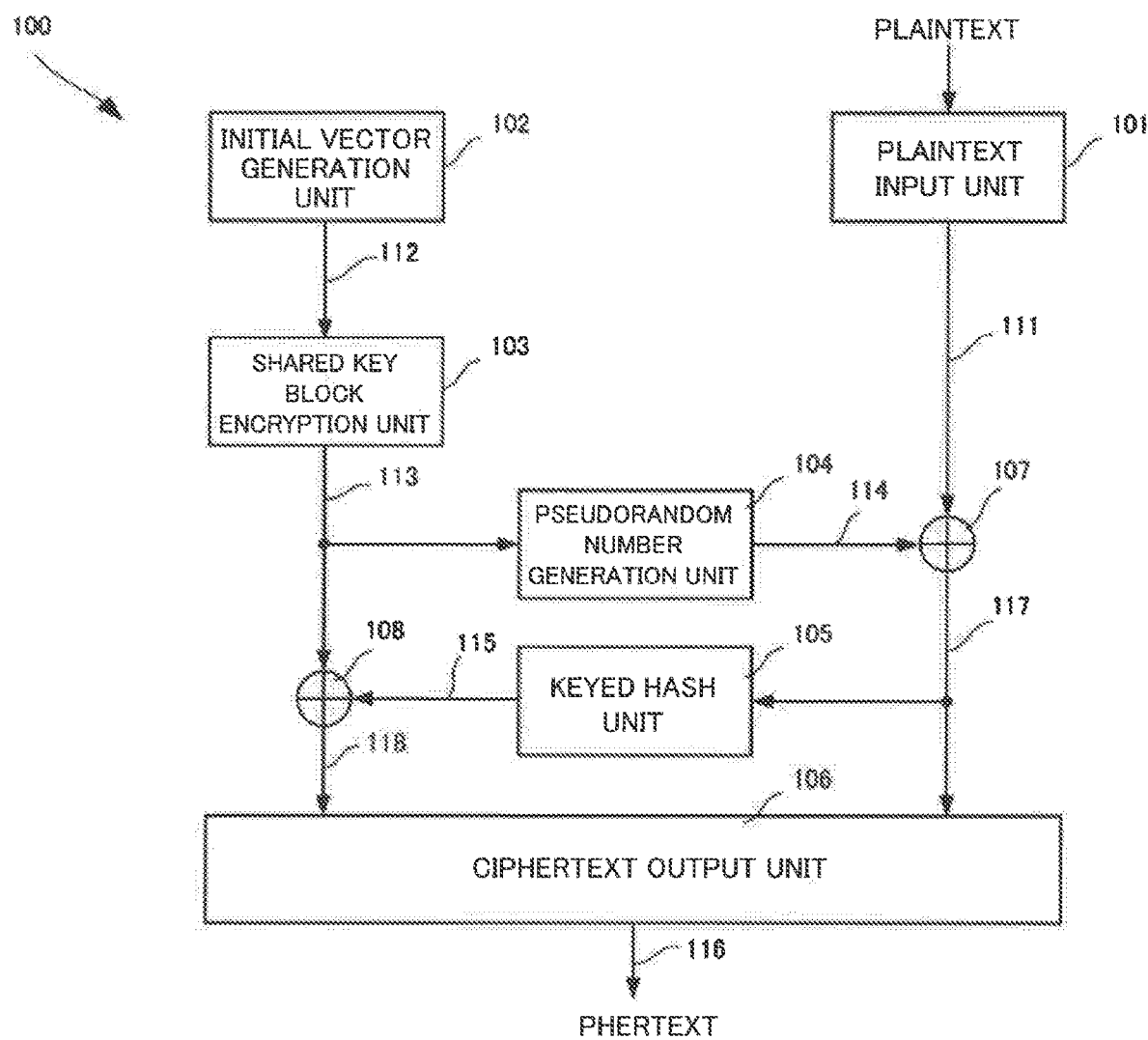
FIG. 1 is a block diagram illustrating a configuration of an information processing device according to a first example embodiment of the present invention.

An information processing device 100 as a first example embodiment of the present invention is described by the use of FIG. 1. The information processing device 100 is a device that performs block encryption on plaintext to generate ciphertext.

As illustrated in FIG. 1, the information processing device 100 includes a plaintext input unit 101, an initial vector generation unit 102, a shared key block encryption unit 103, a pseudorandom number generation unit 104, a keyed hash unit 105, and a ciphertext output unit 106. The plaintext input unit 101 inputs plaintext 111. The initial vector generation unit 102 generates an initial vector 112. The shared key block encryption unit 103 performs shared key block encryption on the initial vector 112 and thereby generates an encrypted initial vector 113. The pseudorandom number generation unit 104, by using the encrypted initial vector 113 as an input, generates a pseudorandom number sequence 114 that has the same length as the plaintext 111 has. The keyed hash unit 105 generates a hash value 115 by using, as an input, a first part 117 of ciphertext obtained by taking an exclusive OR (107) of the pseudorandom number sequence 114 and plaintext 111. The ciphertext output unit 106 combines and outputs, as ciphertext 116, a second part 118 of the ciphertext obtained by taking an exclusive OR (108) of the hash value 115 and the encrypted initial vector 113, and the first part 117.

According to the present example embodiment, it is possible to efficiently enable authenticated encryption with a small increase of a band (length) of ciphertext with respect to plaintext by performing block encryption once and finite field GF ($2^n$) multiplication once per input block.

Second Example Embodiment

Next, an authenticated encryption system according to a second example embodiment of the present invention is described. The authenticated encryption system according to the present example embodiment includes an information processing device that performs authenticated encryption, an information processing device that performs authenticated decryption, or an information processing device that performs authenticated encryption and authenticated decryption.

<<Configuration of Authenticated Encryption System>>

Figure 2:
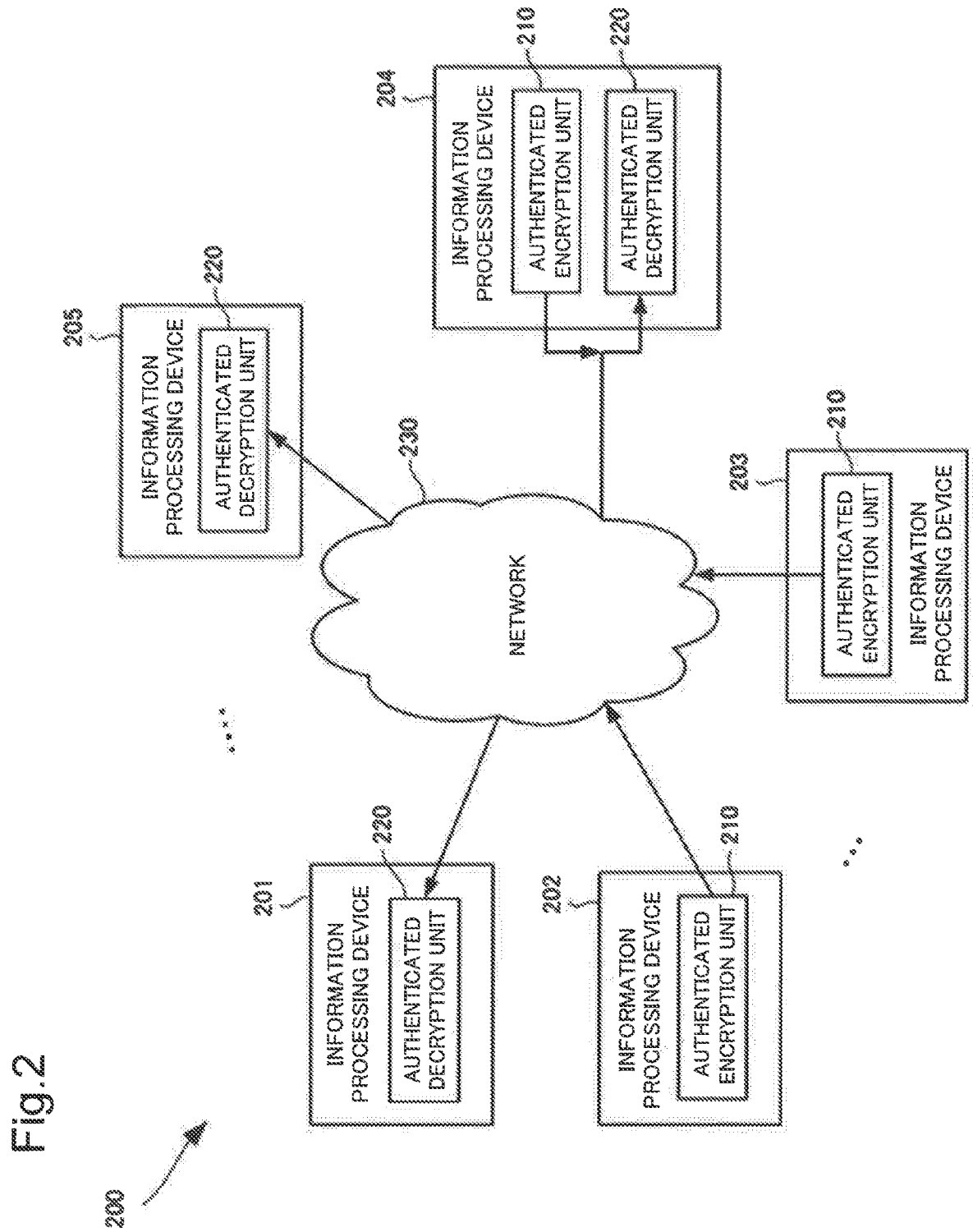
FIG. 2 is a diagram illustrating a configuration of an authenticated encryption system according to a second example embodiment of the present invention.

FIG. 2 is a diagram illustrating a configuration of an authenticated encryption system 200 according to the present example embodiment.

The authenticated encryption system 200 in FIG. 2 includes an information processing device 202 and an information processing device 203, and an information processing device 201 and an information processing device 205. Each of the information processing device 202 and information processing device 203 includes an authenticated encryption unit 210, and transmits ciphertext obtained by performing authenticated encryption on plaintext, via a network 230 Each of the information processing device 201 and information processing device 205 includes an authenticated decryption unit 220, and decrypts ciphertext received via the network 230 to plaintext.

The authenticated encryption system 200 further includes an information processing device 204, which includes the authenticated encryption unit 210 and authenticated decryption unit 220 and which transmits via the network 230 ciphertext obtained by performing authenticated encryption on plaintext and decrypts ciphertext received via the network 230 to plaintext.

Note that, although each information processing device is illustrated as a device having functions of the authenticated encryption unit 210, the authenticated decryption unit 220, and others in FIG. 2, it is also possible to consider each of the encrypted encryption units 210 and authenticated decryption unit 220 to be an authenticated encryption device or an authenticated decryption device as an information processing device. In addition, in FIG. 2, a case in which authenticated encryption is applied to communications between the information processing devices via the network is illustrated. However, the authenticated encryption of the present example embodiment may be applied between an information processing device and a device via a local area network (LAN), between an information processing device and a device (printer, display or storage medium), or between devices, and the same effects can be achieved in such cases.

BACKGROUND TECHNOLOGY

Before detailed description of the authenticated encryption system 200, authenticated encryption unit 210, and authenticated decryption unit 220 of the present example embodiment, a background technology underlying these is described.

(Basics of Authenticated Encryption)

First, basic inputs/outputs of authenticated encryption (AE) are described. Assume that two persons "Alice" and "Bob" share a secret key K, and communication from Alice to Bob is performed by using encryption based on authenticated encryption (AE). Here, the encryption function of the authenticated encryption (AE) is denoted by AEnc, and the decryption function thereof is denoted by ADec. In addition, encryption target plaintext is denoted by M, and a variable called initial vector N is introduced.

First, after Alice generates the initial vector N, the process of $(C,T)=AEnc\_K(N,M)$ is carried out. Here, "AEnc_K" denotes the function using the key K as a parameter, C denotes ciphertext, and T denotes a fixed-length falsification detection variable called tag. Alice transmits (N,C,T) to Bob.

Assume that information received by Bob is (N',C',T'). In this case, Bob computes $ADec\_K(N',C',T')$ as a decryption process. If there has been falsification during the communication and $(N',C',T')\neq(N,C,T)$, the result of $ADec\_K(N',C',T')$ is an error message indicating that there has been falsification. If there has been no falsification and $(N',C',T')=(N,C,T)$, $ADec\_K(N',C',T')=M$, and the plaintext M is decrypted correctly.

Examples of such a scheme are Counter with cipher block chaining message authentication code (CBC-MAC) (CCM) and Galois/Counter mode (GCM). Regarding CCM, refer to "NIST Special Publication 800-38C Recommendation for Block Cipher Modes of Operation: The CCM Mode for Authentication and Confidentiality http://csrc.nist.gov/publications/nistpubs/800-38C/SP800-38C_updated-July20_2007.pdf". This document is referred to as "Document CCM" below. Regarding GCM, refer to "NIST Special Publication 800-38D Recommendation for Block Cipher Modes of Operation: Galois/Counter Mode (GCM) and GMAC http://csrc.nist.gov/publications/nistpubs/800-38D/SP-800-38D.pdf". This document is referred to as "Document GCM" below.

It is important that the initial vectors N do not coincidently match in the above-described process in normal encryption. For this reason, the encryption side holds some kind of state variable to prevent coincidence of initial vectors. This is typically enabled by storing the initial vector N most recently used as a state variable, and incrementing the initial vector N every time.

However, in the above-described normal authenticated encryption scheme, the initial vector N and the tag T, in addition to the ciphertext C that is encrypted plaintext M and thereby has the same length as the plaintext M has, need to be transmitted in combination with the ciphertext C. Although each of the initial vector N and the tag T is represented by a short value of approximately 4 bytes to 32 bytes in a normal process, the increase of a communication band due to addition of the initial vector N and the tag T is unignorable, for example, in a case where the plaintext M is as short as the initial vector N and tag T. Such a case frequently occurs in relation to wireless sensor network devices, for example. Since a communication band is an important factor that affects power consumption in such a network, band reduction is an important problem. Moreover, when a message authentication function is newly added to a communication path in which encryption without any message authentication function is performed, to implement an authenticated encryption function as a whole, a change in a protocol is sometimes required irrespective of message length. Such a case may encounter practical difficulty.

(Band Reduction Technique)

As a method for solving such an issue regarding band, there is NPL 1 described above. In AERO in NPL 1, by the use of wide pseudorandom permutation (WPRP) $P\_K$ of variable-length input/output having K as a key, $C=P\_K(N,M)$ is provided as an overall output for an input $(N,M)$ obtained by combining the initial vector N and plaintext M. The length of ciphertext C is equal to the sum of the lengths of the initial vector N and the plaintext M. The decryption side obtains (N,M) by applying inverse permutation of P_K to the ciphertext C by the use of the shared key K and determines whether authentication is correctly checked on the basis of whether the decrypted initial vector N matches an expected value.

To determine whether the decrypted initial vector N has the expected value, it is necessary that the decryption side knows in advance the initial vector N that the encryption side is to use. This is possible when the encryption side and the decryption side are synchronized in terms of update of the initial vector N. This is typically enabled by the encryption side storing the initial vector of the most recently transmitted normal ciphertext. This condition is natural in a case where the decryption side is required to detect and eliminate replay.

As described above, in the AERO scheme, the information that the encryption side has to transmit is only the ciphertext C. Since the length of the ciphertext C is equal to the sum of the lengths of the initial vector N and plaintext M, the increase of the band due to the encryption corresponds to the initial vector only. For this reason, the band corresponding to the tag T can be reduced in comparison with the above-described general authenticated encryption scheme. In addition, owing to the nature of WPRP, the plaintext obtained as a result of decrypting ciphertext excluding replay is randomized overall. This makes it difficult for attackers to perform such a control as to set the part originally including the initial vector at a particular value, which reduces the probability of the initial vector having the value expected by the decryption side to a negligible extent.

(Authenticated Encryption Using XCB Mode)

In the AERO scheme in NPL 1, a block cipher use mode called XCB mode as that in PTL 1 is suggested to use as WPRP. In the case of 128-bit-block-based split, three-pass encryption is configured for the plaintext M of m blocks in the XCB mode.

Figure 4:
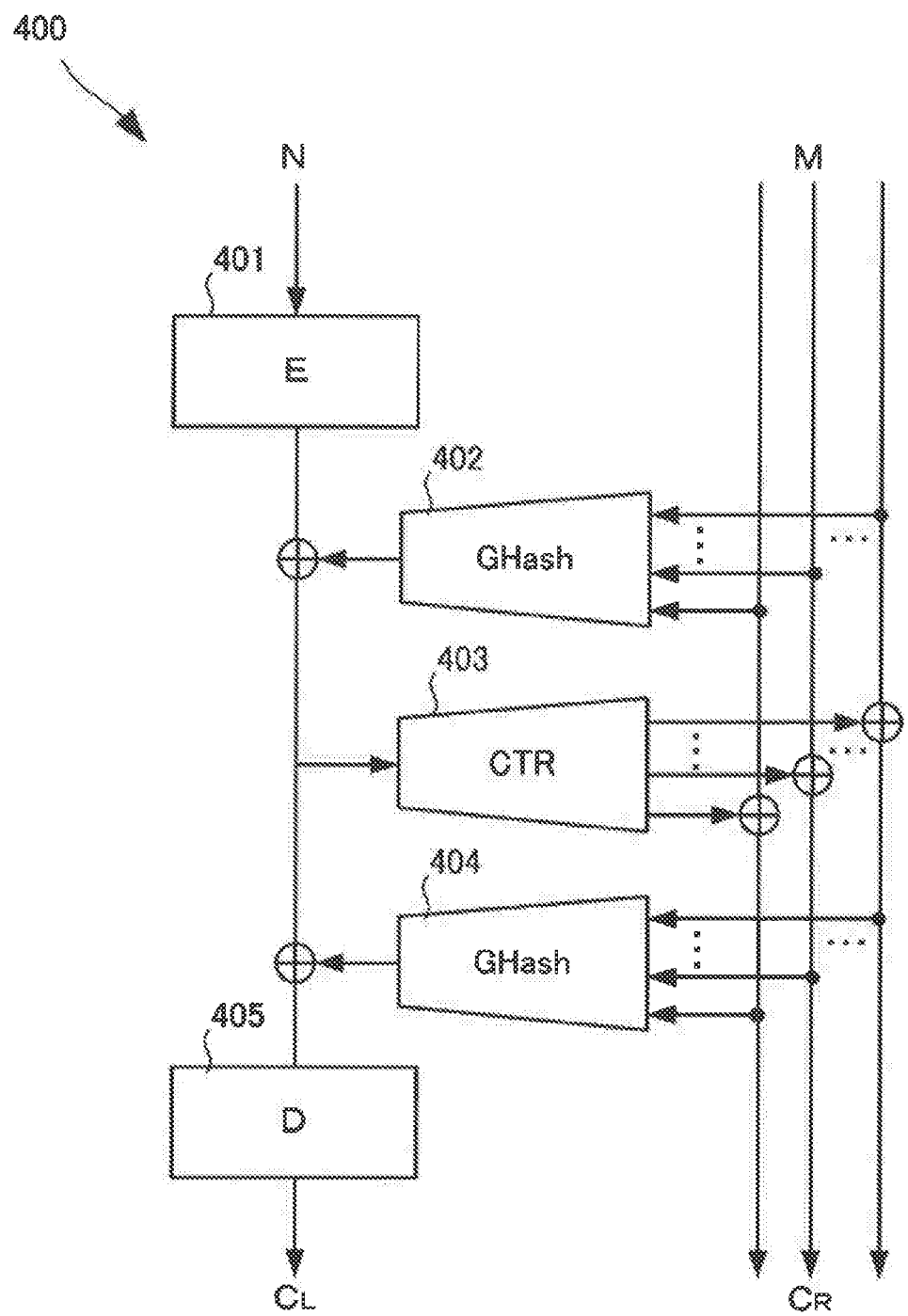
FIG. 4 is a block diagram illustrating a functional configuration of an authenticated encryption unit using an XCB mode according to a presupposed background technology.

FIG. 4 is a block diagram illustrating a functional configuration of an authenticated encryption unit 400 using the XCB mode according to the background technology.

The exclusive OR of a first intermediate value obtained by a shared key encryption unit E 401 encrypting the initial vector N and a polynomial hash generated from the plaintext M by GHash 402, which is the first pass, is taken, thereby generating a second intermediate value. Block encryption is performed on the second intermediate value through counter mode encryption 403, which is an intermediate pass. Then, exclusive OR of the result obtained through the block encryption and the plaintext M is taken, thereby generating a first part CR of ciphertext. Meanwhile, exclusive OR of the second intermediate value and a polynomial hash generated from the first part CR by GHash 404, which is the last pass, is taken, thereby generating a third intermediate value. Decryption processing is performed on the third intermediate value by a shared key decryption unit D 405, thereby generating a second part CL of the ciphertext.

Here, the first pass and the last pass respectively execute the GHash 402 and GHash 404, each of which is polynomial hash over GF ($2^{128}$). Moreover, the intermediate pass performs the counter mode encryption 403 using a 128-bit block cipher. Hence, the load is higher than that of normal encryption. Specifically, it is needed that block encryption be performed once, and multiplication over GF ($2^{128}$) be performed twice, per input block.

In the present example embodiment, contrivance is performed to enable efficient achievement of authenticated encryption with a small increase of band (length) of ciphertext with respect to plaintext. Detailed description is given below of the authenticated encryption unit 210 and authenticated decryption unit 220 of the authenticated encryption system 200 of the present example embodiment. The length of one block is assumed to be n bits unless otherwise stated.

<<Functional Configuration of Authenticated Encryption Unit>>

Figure 3:
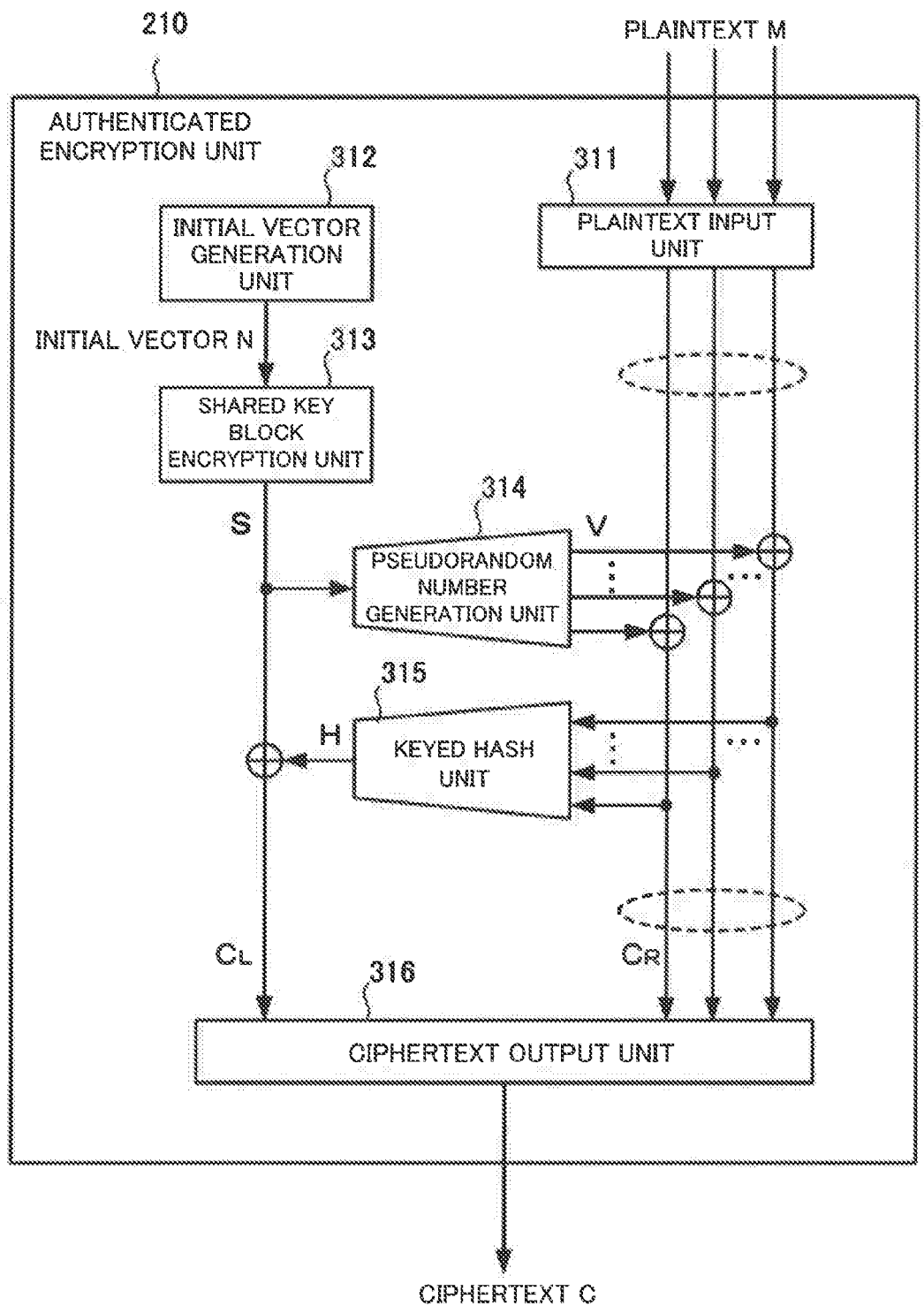
FIG. 3 is a block diagram illustrating a functional configuration of an authenticated encryption unit as an information processing device according to the second example embodiment.

FIG. 3 is a block diagram illustrating a functional configuration of the authenticated encryption unit 210 as an information processing device according to the present example embodiment.

The authenticated encryption unit 210 includes a plaintext input unit 311, an initial vector generation unit 312, a shared key block encryption unit 313, a pseudorandom number generation unit 314, a keyed hash unit 315, and a ciphertext output unit 316. The authenticated encryption unit 210 can be implemented by a central processing unit (CPU), a memory, and a disk, and each functional component can also be implemented by causing a program stored in the disk in advance to operate on the CPU.

Next, the functional components constituting the authenticated encryption unit 210 are described.

(Plaintext Input Unit)

The plaintext input unit 311 is a functional component that inputs plaintext M which is a target. This is achieved, for example, by a character input unit, such as a keyboard, or by reading the plaintext M from a storage medium storing plaintext or receiving the plaintext M via a communication medium.

(Initial Vector Generation Unit)

The initial vector generation unit 312 is a functional component that generates an initial vector different from any value generated in the past. For example, a simple configuration may be that of outputting an arbitrary fixed value first and, for the second time and thereafter, storing the most recently generated initial vector value and outputting the value obtained by adding "1" to the stored value. In this case, when the most recently used initial vector is denoted by N, the new initial vector N'=N+1. Here, an update process can be represented by using an initial vector update function f(N)=N+1. In initial vector generation, an initial vector may be generated by combining pieces of auxiliary information, such as time information. In such a case, it is assumed that the encryption side and decryption side are synchronized in terms of the pieces of auxiliary information. For the purpose of simplicity, it is assumed, in the following description, that the next initial vector is determined on the basis only of the most recently used initial vector in update without any auxiliary information. However, this does not mean loss of generality. In addition, although the initial vector N is assumed to be n bits, appropriate padding is performed to obtain a block if the initial vector N is short.

(Shared Key Block Encryption Unit)

The shared key block encryption unit 313 is a functional component that encrypts the one-block initial vector N, and outputs an encrypted initial vector S that has the same length as the initial vector N has. For example, the shared key block encryption unit 313 is achieved by a block cipher encryption function.

Figure 5:
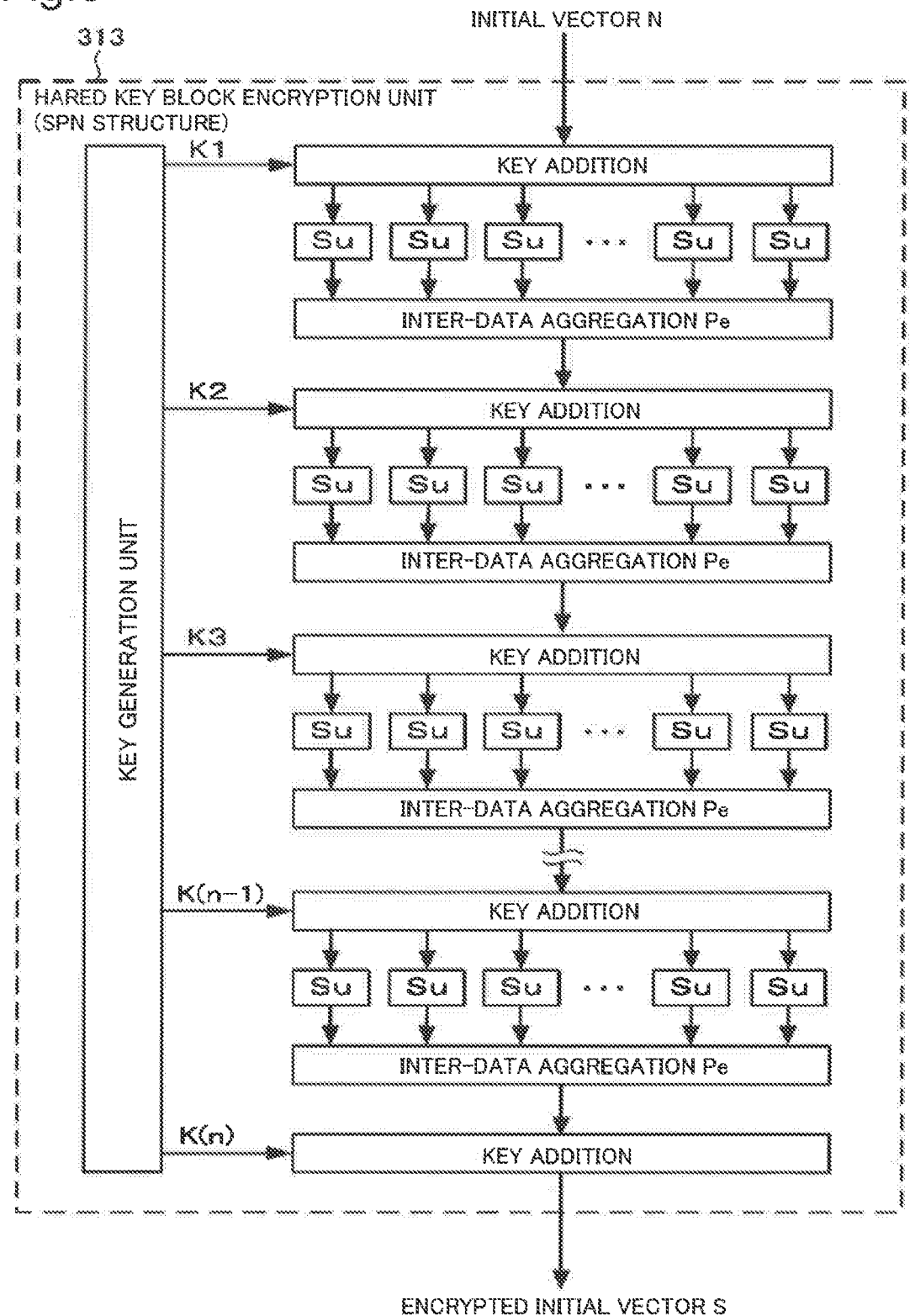
FIG. 5 is a diagram illustrating an example of a configuration of a shared key block encryption unit according to the second example embodiment.

FIG. 5 is a diagram illustrating an example of a configuration of a shared key block encryption unit 313 according to the present example embodiment. FIG. 5 illustrates a case of the substitution permutation network (SPN) structure.

In FIG. 5, "Su" denotes substitution, and "Pe" denotes permutation. For details, refer to "NIST, "Advanced Encryption Standard (AES)", FIPS PUB 197, http://csrc.nist.gov/publications/fips/index.html".

Figure 6:
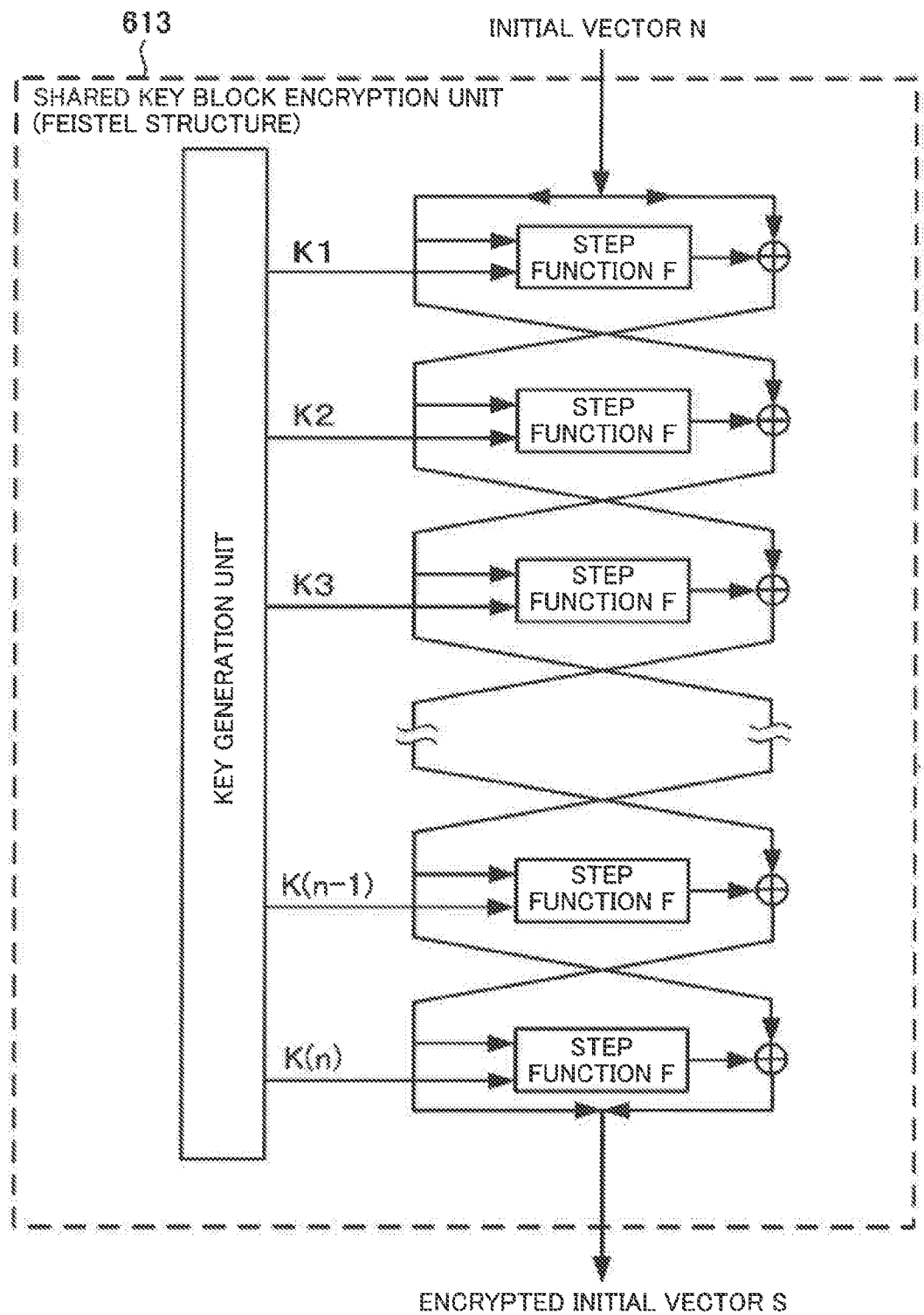
FIG. 6 is a diagram illustrating an example of a configuration of another shared key block encryption unit according to the second example embodiment.

FIG. 6 is a diagram illustrating an example of a configuration of another shared key block encryption unit 613 according to the present example embodiment. FIG. 6 illustrates a case of shared key block encryption based on the Feistel structure. For details, refer to "Aoki, Ichikawa, Kanda, Matsui, Moriai, Nakajima, Tokita, "Camellia: A 128-Bit Block cipher Suitable for Multiple Platforms (Version 2.0)" http://info.isl.ntt.co.jp/crypt/camellia/dl/01jspec.pdf".

Here, although encryption and decryption are performed by different processes in the SPN structure in FIG. 5, encryption and decryption are performed by the same process in the Feistel structure in FIG. 6. Note that the configuration of the shared key block encryption unit 313 is not limited to those in FIG. 5 and FIG. 6.

(Pseudorandom Number Generation Unit)

The pseudorandom number generation unit 314 is a functional component unit that generates a pseudorandom number sequence V that has the same length as the plaintext M has, by the use of the encrypted one-block initial vector S. Specifically, the pseudorandom number generation unit 314 is a fixed-length-input/variable-length-output pseudorandom function. Such a function can be generated in the modified counter mode or modified output-feedback (OFB) mode in the case of using a block cipher, for example.

Figure 7:
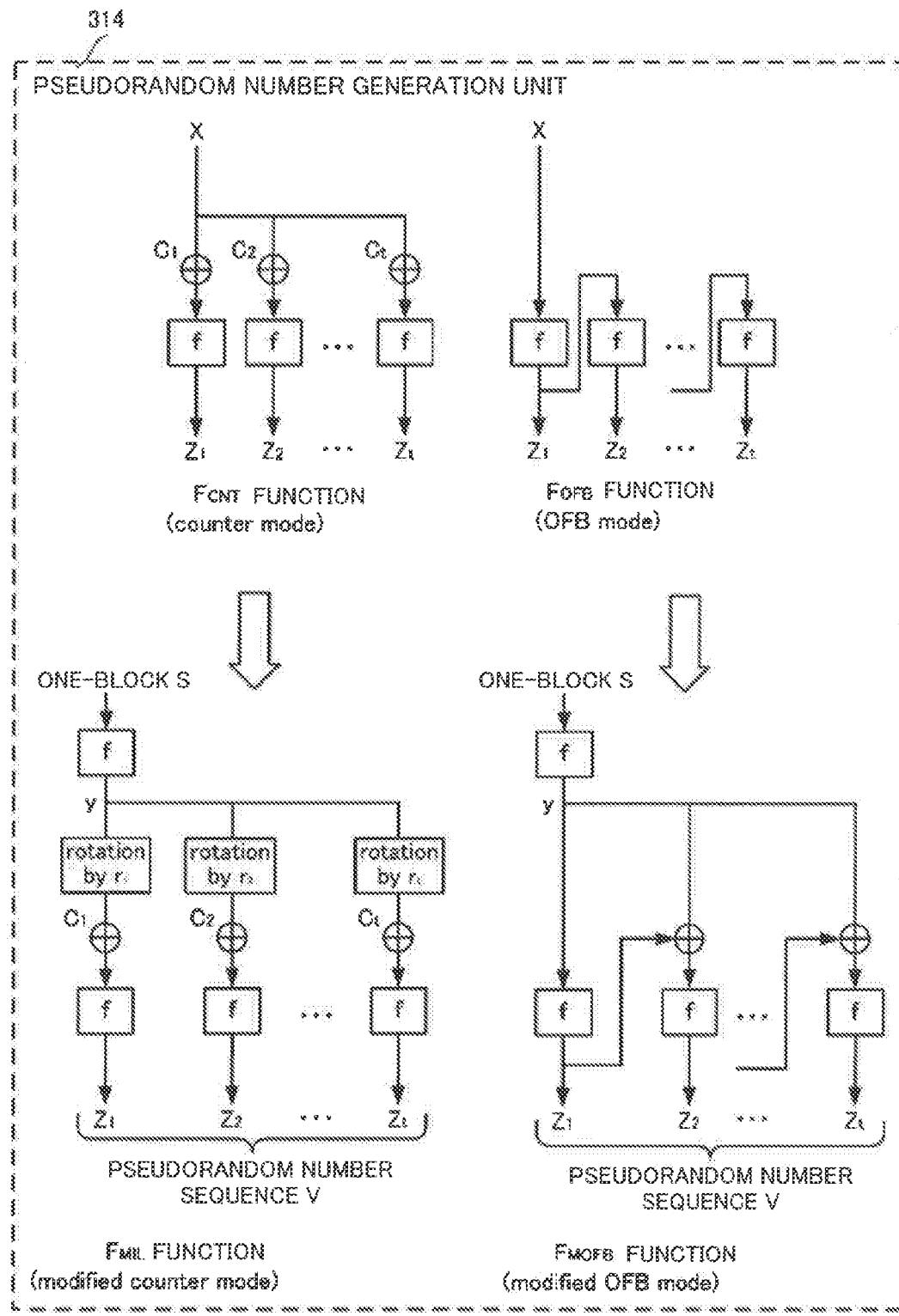
FIG. 7 is a diagram illustrating an example of a configuration of a pseudorandom number generation unit according to the second example embodiment.

FIG. 7 is a diagram illustrating an example of a configuration of the pseudorandom number generation unit 314 according to the present example embodiment. In FIG. 7, the upper half presents configurations of the basic counter mode and OFB mode, while the lower half presents configurations of the modified counter mode and modified OFB mode.

For details, refer to "Henri Gilbert, The Security of "One-Block-to-Many" Modes of Operation, Fast Software Encryption 2003, LNCS 2887 Springer 2003, ISBN 3-540-20449-0". This document is referred to as "Document Gil" below.

When using the modified counter mode or modified OFB mode, the pseudorandom number generation unit 314 can be achieved only by a block cipher. Moreover, when using the modified counter mode, processes of generating output blocks can be performed in parallel.

Alternatively, a stream cipher with an initial vector can be used for the pseudorandom number generation unit 314. For details, refer to "The eSTREAM Portfolio, http://www.ecrypt.eu.org/documents/D.SYM.10-vl.pdf". This document is referred to as "Document eSTREAM" below.

(Keyed Hash Unit)

The keyed hash unit 315 is a functional component that outputs a keyed hash value H by using, as an input, a first part CR of ciphertext, which is the exclusive OR of the plaintext M and the pseudorandom number sequence V output by the pseudorandom number generation unit 314. Specifically, the keyed hash unit 315 is a pseudorandom function of obtaining a one-block output from a variable-length input. Examples in the case of using a block cipher are cipher-based message authentication code (CMAC) and a method of combining polynomial hash over finite field and block cipher encryption. Specifically, when a polynomial hash is denoted by F (key is denoted by L) and the block cipher encryption function is denoted by E (key is denoted by K), $E\_K(F\_L(X))$ may be output for an input X.

Figure 8:
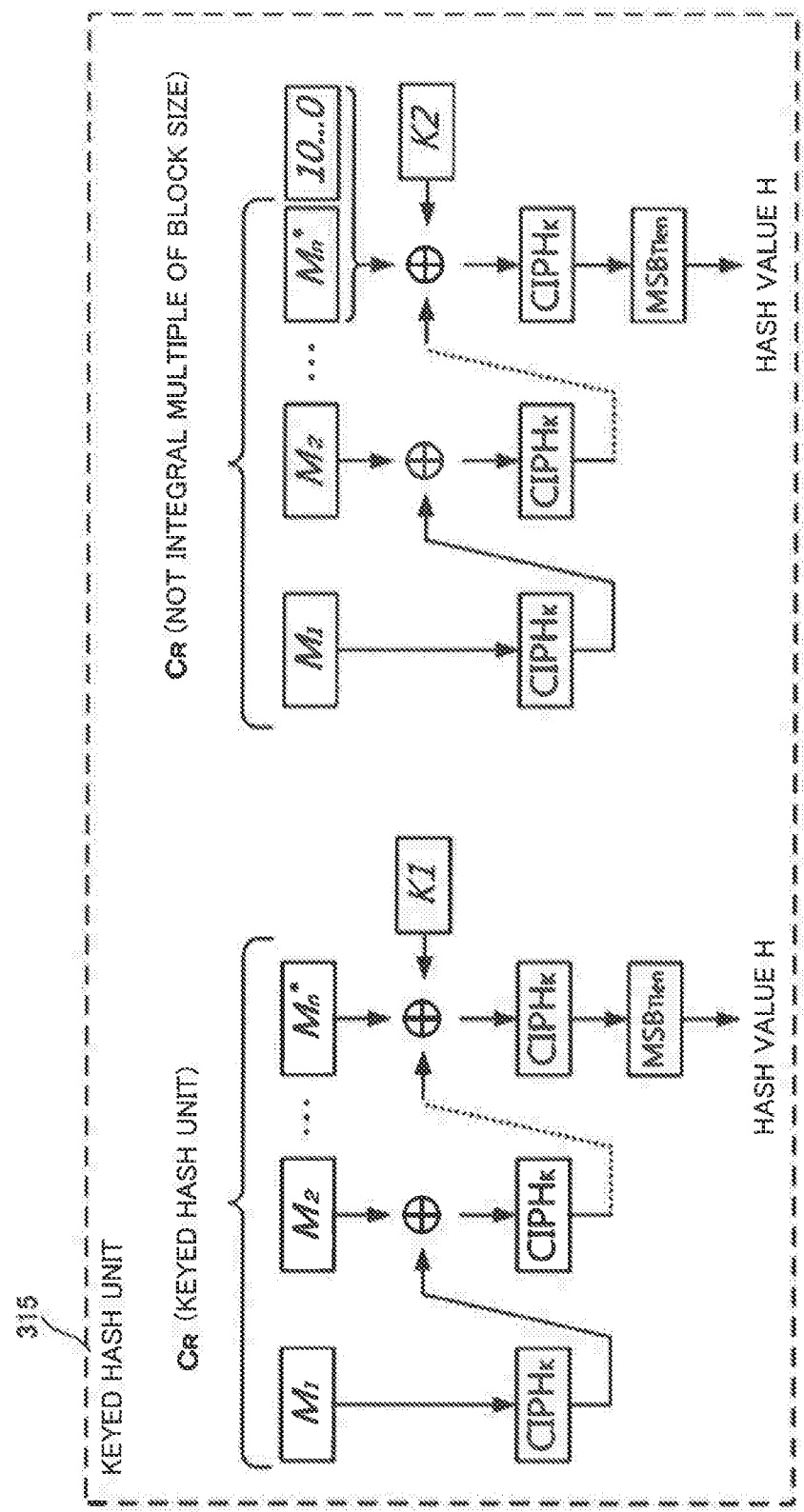
FIG. 8 is a diagram illustrating an example of a configuration of a keyed hash unit according to the second example embodiment.

FIG. 8 is a diagram illustrating an example of a configuration of the keyed hash unit 315 according to the present example embodiment. FIG. 8 illustrates a configuration of a case where the first part CR of the ciphertext is an integral multiple of the block size (left side of the drawing) and a configuration of a case where the first part CR is not the integral multiple (right side of the drawing) in CMAC.

For details of CMAC, refer to "NIST Special Publication 800-38B Recommendation for Block Cipher Modes of Operation: The CMAC Mode for Authentication http://csrc.nist.gov/publications/nistpubs/800-38B/SP_800-38B.pdf". This document is referred to as "Document CMAC" below.

Figure 9:
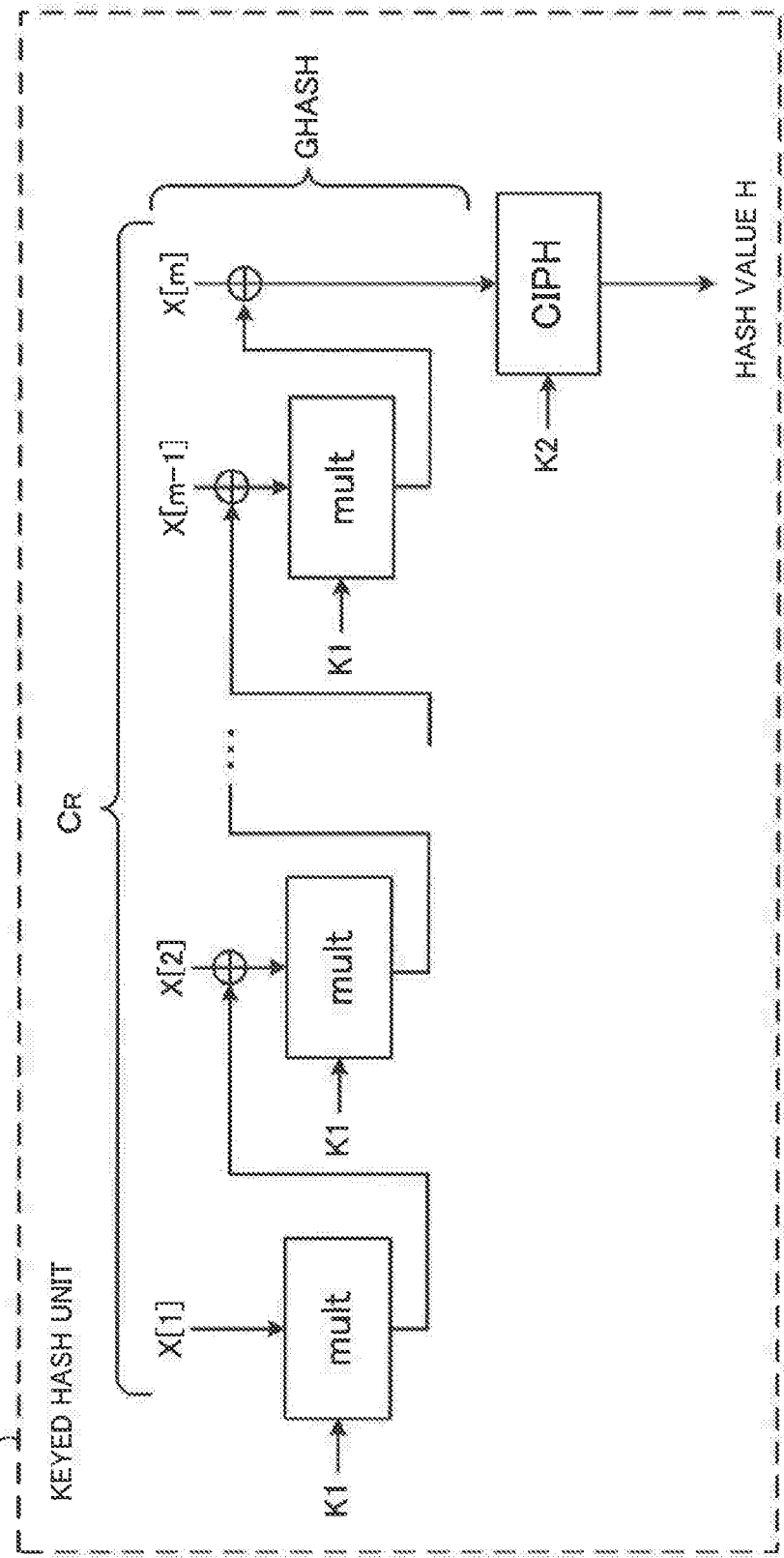
FIG. 9 is a diagram illustrating an example of a configuration of another keyed hash unit according to the second example embodiment.

FIG. 9 is a diagram illustrating an example of a configuration of another keyed hash unit 815 according to the present example embodiment. FIG. 9 illustrates the keyed hash unit 815 using a polynomial hash over a finite field and block cipher encryption. In FIG. 9, "mult" denotes multiplication over $GF(2^{128})$, and the key is denoted by K1. Moreover, "CIPH" denotes a block cipher encryption function, and the key is denoted by K2.

Regarding polynomial hash over a finite field, refer to "Daniel J. Bernstein, The Poly1305-AES Message-Authentication Code, Fast Software Encryption 2005, LNCS 3557, pp. 32-49". This document is referred to as "Document Poly" below. Note that, although the part of GHASH in FIG. 9 is replaced with a different function in Document Poly, there is no particular change in terms of security and efficiency. The keyed hash unit 815 can be implemented in either case of GHASH or Document Poly.

(Ciphertext Output Unit)

The ciphertext output unit 316 is a functional component that outputs ciphertext C by combining the second part CL and first part CR of the ciphertext. The second part ciphertext CL is the exclusive OR of a hash value H output by the keyed hash unit 315 and the encrypted initial vector S output by the shared key block encryption unit 313. The ciphertext C is output to a computer display or a printer, for example.

<<Hardware Configuration of Authenticated Encryption Unit>>

Figure 10:
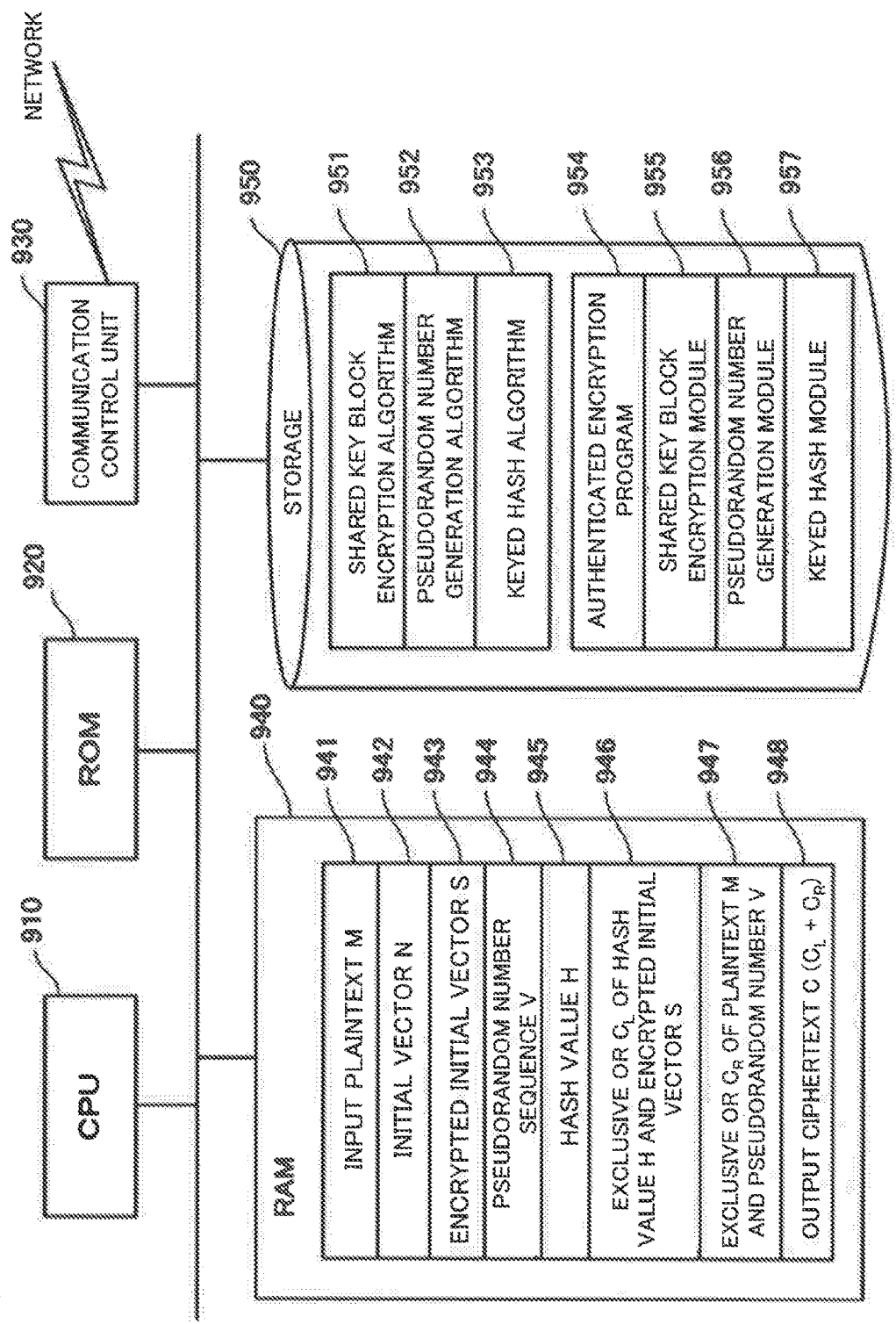
FIG. 10 is a block diagram illustrating a hardware configuration of the authenticated encryption unit according to the second example embodiment.

FIG. 10 is a block diagram illustrating a hardware configuration of the authenticated encryption unit 210 according to the present example embodiment.

In FIG. 10, a CPU 910 is an operation control processor and achieves the functional components in FIG. 3 by executing a program. A read only memory (ROM) 920 stores fixed data, such as initial data and a program. A communication control unit 930 communicates with a different device via a network. Note that the CPU 910 is not limited to one, may be a plurality of CPUs, and may include a graphic processing unit (GPU) for image processing. Moreover, the communication control unit 930 preferably includes a CPU separate from the CPU 910 by which writing or reading reception/transmission data to or from an area in a random access memory (RAM) 940. In addition, it is preferable that a direct memory access controller (DMAC) that transfers data between the RAM 940 and storage 950 be provided (not illustrated). With this configuration, the CPU 910 recognizes that data is received at or transferred to the RAM 940 and processes the data. Moreover, the CPU 910 prepares a processing result in the RAM 940 and lets the communication control unit 930 and the DMAC be in charge of subsequent transmission or transfer.

The RAM 940 is a random access memory used by the CPU 910 as a temporary storage work area. An area storing data necessary for achieving the present example embodiment is reserved in the RAM 940. Input plaintext M 941 is plaintext on which the authenticated encryption unit 210 performs authenticated encryption. An initial vector N 942 is data generated so as not to be identical with any of past values. An encrypted initial vector S 943 is data obtained by performing shared key block encryption on the initial vector N 942. A pseudorandom number sequence V 944 is a pseudorandom number generated on the basis of the encrypted initial vector S 943. A hash value H 945 is a hash value generated on the basis of the first part CR of the ciphertext. An exclusive OR CL 946 of the hash value H and the encrypted initial vector S is the second part CL of the ciphertext. An exclusive OR CR 947 of the plaintext M and the pseudorandom number sequence V is the first part CR of the ciphertext. Output ciphertext C is ciphertext generated by combining the first part CR and second part CL of the ciphertext.

The storage 950 stores databases and various parameters, or the following data or program necessary for achieving the present example embodiment. A shared key block encryption algorithm 951 is a shared key block encryption algorithm used in the present example embodiment. A pseudorandom number generation algorithm 952 is a pseudorandom number generation algorithm used in the present example embodiment. A keyed hash algorithm 953 is a keyed algorithm used in the present example embodiment. The storage 950 stores the following program. An authenticated encryption program 954 is a program of controlling the entire authenticated encryption process. A shared key block encryption module 955 is a module that performs shared key block encryption in accordance with the shared key block encryption algorithm 951. A pseudorandom number generation module 956 is a module that performs pseudorandom number generation in accordance with the pseudorandom number generation algorithm 952. A keyed hash module 957 is a module that performs keyed hash generation in accordance with the keyed hash algorithm 953.

Programs and data associated with general-purpose functions or other achievable functions of the authenticated encryption unit 210 are not illustrated in the RAM 940 and storage 950 in FIG. 10. Moreover, programs and data associated with general functions or other achievable functions of the information processing device including the authenticated encryption unit 210 are not illustrated either.

<<Operation Procedure of Authenticated Encryption Unit>>

Figure 11:
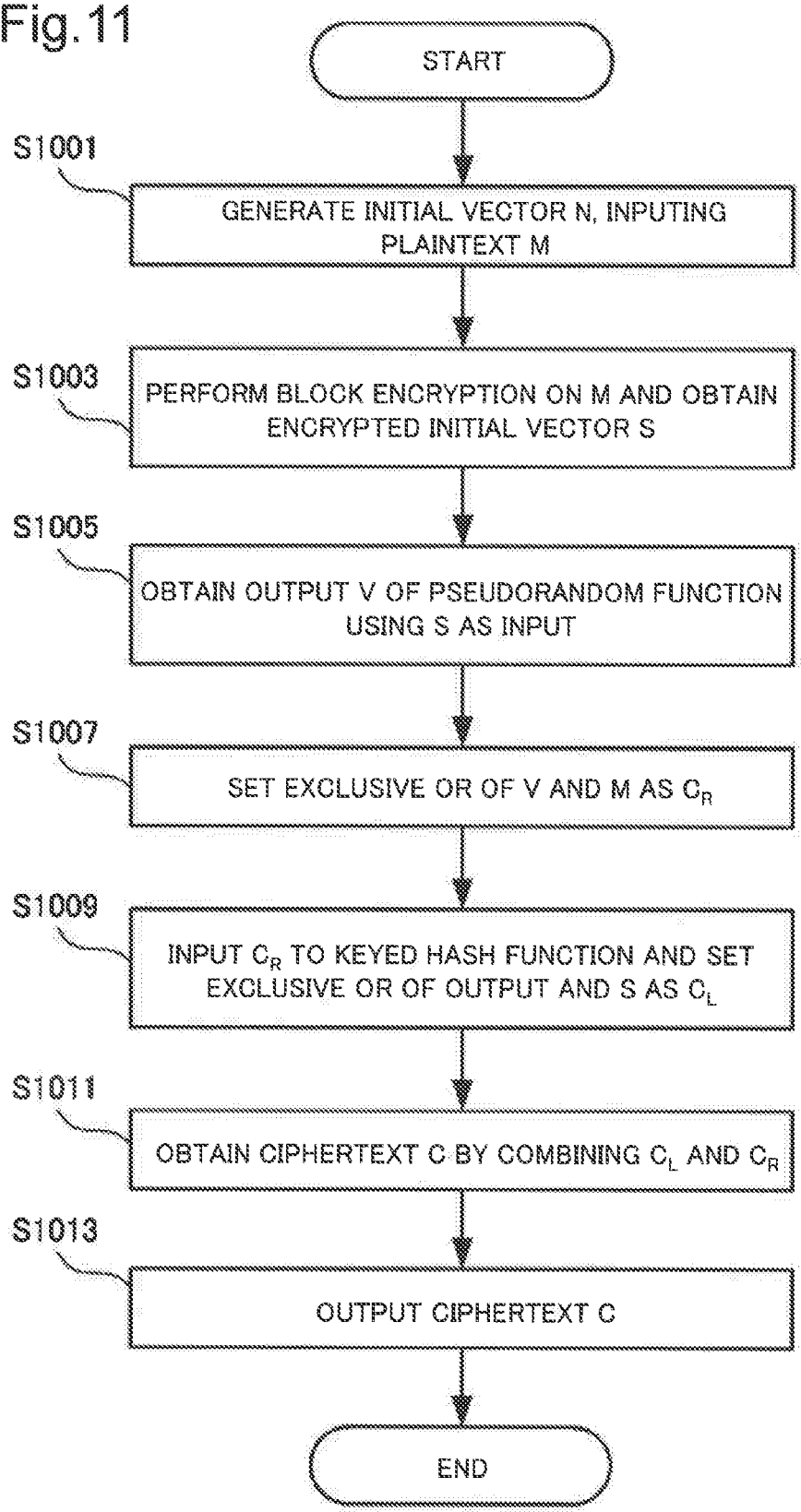
FIG. 11 is a flowchart illustrating an operation procedure of the authenticated encryption unit according to the second example embodiment.

FIG. 11 is a flowchart illustrating an operation procedure of the authenticated encryption unit 210 according to the present example embodiment. This flowchart is practiced by the CPU 910 in FIG. 10 by using the RAM 940 to achieve the functional components in FIG. 3. Note that the operation order of the authenticated encryption is not limited to that in FIG. 11.

In Step S1001, the authenticated encryption unit 210 inputs target plaintext M, and generates an initial vector N. Then, in Step S1003, the authenticated encryption unit 210, by performing shared key block encryption on the initial vector N, obtains an encrypted initial vector S that has the same length as the initial vector N has. Then, in Step S1005, the authenticated encryption unit 210 obtains a pseudorandom number sequence V, which is an output of the pseudorandom function with the encrypted initial vector S as an input.

Then, in Step S1007, the authenticated encryption unit 210 sets the exclusive OR of the pseudorandom number sequence V and plaintext M to be blocks (first part CR) other than the leftmost block of ciphertext. Then, in Step S1009, the authenticated encryption unit 210 generates a keyed hash H from the first part CR, and sets the exclusive OR of the obtained one-block keyed hash H and the encrypted initial vector S to be the leftmost block (second part CL) of the ciphertext. Then, in Step S1011, the authenticated encryption unit 210 obtains ciphertext C by combining the second part CL and the first part CR. Then, lastly, in Step S1013, the authenticated encryption unit 210 outputs the obtained ciphertext C. Note that the second part CL does not need to be leftmost but is preferably at one of the ends of the ciphertext.

<<Functional Configuration of Authenticated Decryption Unit>>

Figure 12:
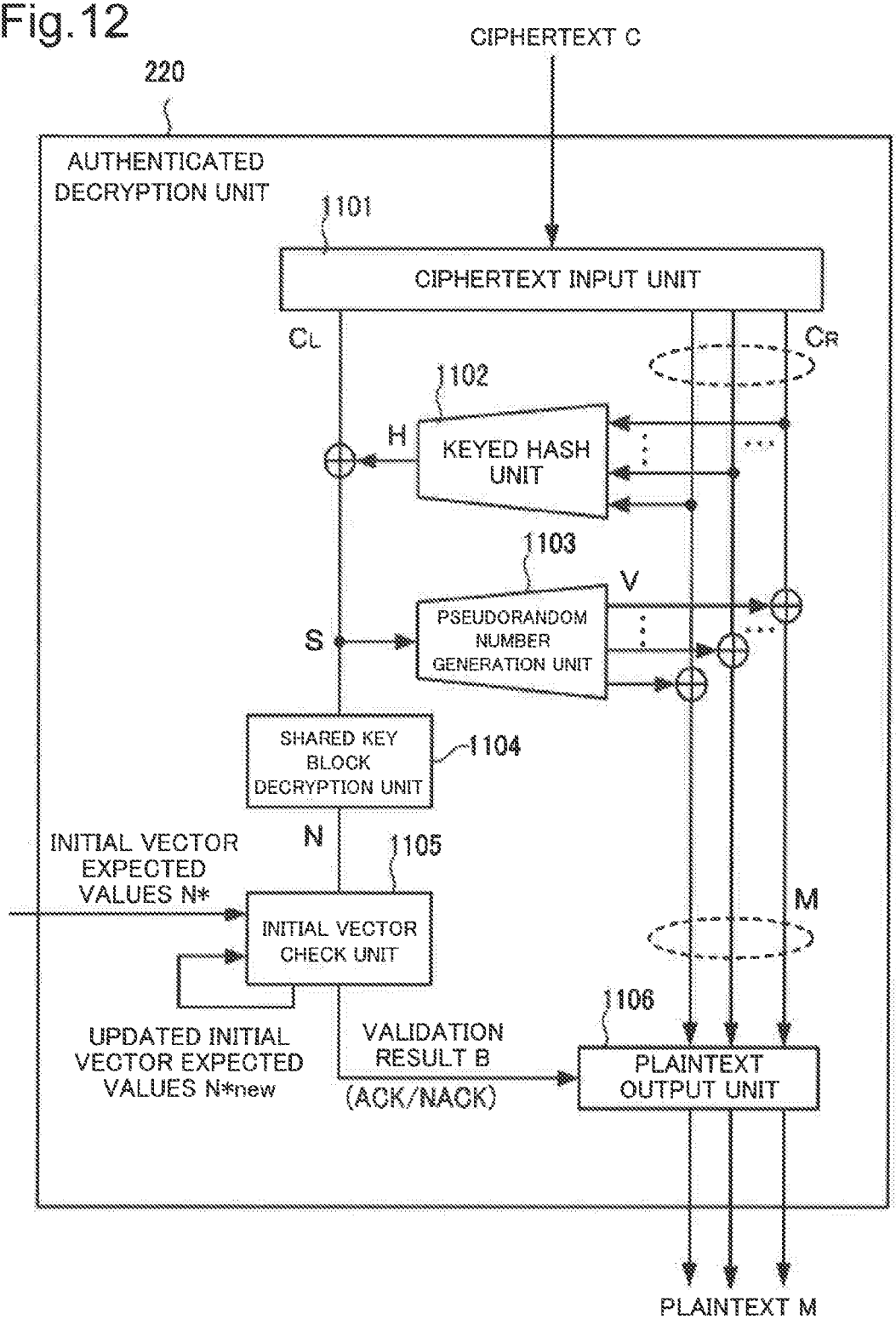
FIG. 12 is a block diagram illustrating a functional configuration of an authenticated decryption unit as an information processing device according to the second example embodiment.

FIG. 12 is a block diagram illustrating a functional configuration of the authenticated decryption unit 220 as an information processing device according to the present example embodiment.

The authenticated decryption unit 220 includes a ciphertext input unit 1101, a keyed hash unit 1102, a pseudorandom number generation unit 1103, a shared key block decryption unit 1104, an initial vector check unit 1105, and a plaintext output unit 1106. The authenticated decryption unit 220 can be achieved by a CPU, a memory, and a disk, and each functional component can be achieved by a program being stored in the disk in advance and being caused to operate on the CPU.

Next, the functional components configuring the authenticated decryption unit 220 are described.

(Ciphertext Input Unit)

The ciphertext input unit 1101 is a functional component that inputs ciphertext which is a target. This is achieved, for example, by a character input unit, such as a keyboard, or by reading the ciphertext from a storage medium storing plaintext or receiving the ciphertext via a communication medium. The ciphertext input unit 1101 separates the ciphertext C into the first part CR and the second part CL, and outputs them. For example, the second part CL is set to be the one leftmost block of the ciphertext, and the first part CR is set to be all the blocks of the ciphertext other than the leftmost block.

(Keyed Hash Unit)

The keyed hash unit 1102 is a functional component that outputs a one-block keyed hash value H using the first part CR as an input. Specifically, the keyed hash unit 1102 is a pseudorandom function of obtaining a one-block output from a variable-length input, and can be achieved by a functional component similar to the keyed hash unit 315 of the authenticated encryption unit 210.

(Pseudorandom Number Generation Unit)

The pseudorandom number generation unit 1103 is a functional component that generates a pseudorandom number sequence V that has the same length as the first part CR has, by using, as an input, the encrypted initial vector S that is the exclusive OR of the hash value H output by the keyed hash unit 1102 and the second part CL of the ciphertext. Specifically, the pseudorandom number generation unit 1103 is a fixed-length-input/variable-length-output pseudorandom function, and can be achieved by a functional component similar to the pseudorandom number generation unit 314 of the authenticated encryption unit 210.

(Shared Key Block Decryption Unit)

The shared key block decryption unit 1104 is a functional component that decrypts the encrypted initial vector S and obtains the initial vector N. Specifically, the shared key block decryption unit 1104 can be achieved by a decryption function capable of dealing with the block cipher used by the shared key block encryption unit 313 of the authenticated encryption unit 210.

Figure 13:
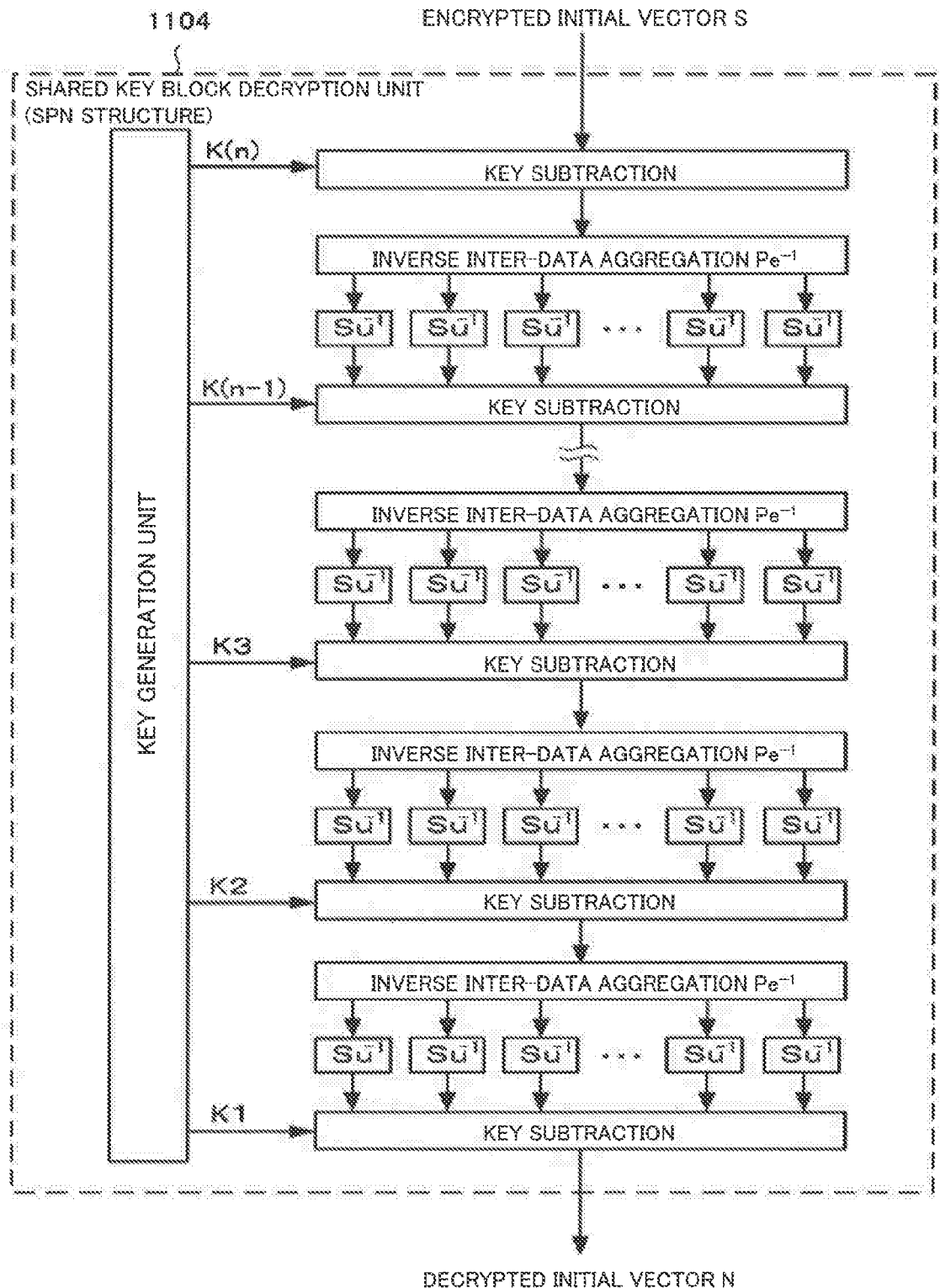
FIG. 13 is a diagram illustrating an example of a configuration of a shared key block decryption unit according to the second example embodiment.

FIG. 13 is a diagram illustrating an example of a configuration of the shared key block decryption unit 1104 according to the present example embodiment. FIG. 13 illustrates a case of shared key block decryption based on the SPN structure.

In FIG. 13, "Su−1" denotes inverse substitution, and "Pe−1" denotes inverse permutation.

Since shared key block decryption based on the Feistel structure is similar to shared key block encryption with an only difference in that the keys are used in the inverse order, illustration of this shared key block decryption is omitted. Moreover, the shared key block decryption unit 1104 may be any as long as suitable for the shared key block encryption unit 313 without being limited particularly.

(Initial Vector Check Unit)

The initial vector check unit 1105 is the following functional component. First, the initial vector check unit 1105 verifies and compares the initial vector output by the shared key block decryption unit 1104 and initial vector expected values N*, which is expected with respect to the ciphertext C by the decryption side. Secondly, the initial vector check unit 1105 outputs B, which is the binary representation of the verification result (acknowledge (ACK) in the case of verification success and negative-ACK (NACK) in the case of verification failed), and initial vector expected values N*new to be used in next decryption of ciphertext. B=ACK is output when the decrypted initial vector N and the initial vector expected values N* match, and B=NACK is output when the decrypted initial vector N and the initial vector expected values N* do not match. Moreover, assume that the initial vector update function used by the encryption side is denoted by f. In this case, update is performed to be N*new=f(N) when B=ACK, and N*new=N* is maintained without update when B=ACK.

Figure 14:
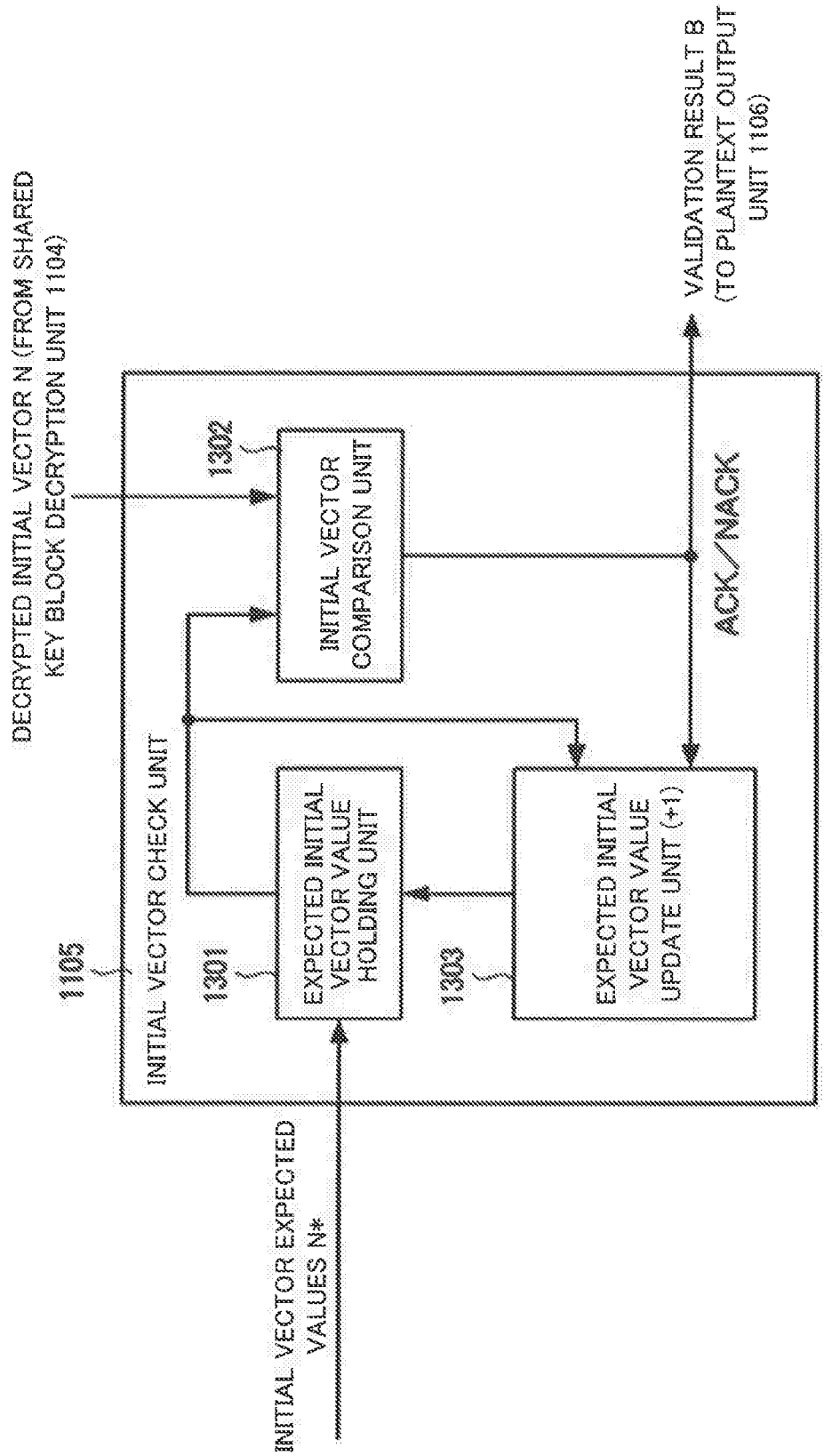
FIG. 14 is a diagram illustrating an example of a configuration of an initial vector check unit according to the second example embodiment.

FIG. 14 is a diagram illustrating an example of a configuration of the initial vector check unit 1105 according to the present example embodiment.

The initial vector check unit 1105 includes an expected initial vector value holding unit 1301, an initial vector comparison unit 1302, and an expected initial vector value update unit 1303.

The expected initial vector value holding unit 1301 holds the first initial vector expected values N* and also subsequently holds outputs from the expected initial vector value update unit 1303. The first initial vector expected values N* may be input or received from an external device or may be held beforehand as keys and the like. The initial vector comparison unit 1302 compares the current expected initial vector N* held by the expected initial vector value holding unit 1301 and the decrypted initial vector N, which is an output from the shared key block decryption unit 1104. Then, the initial vector comparison unit 1302 outputs, as the verification result B of comparison thereof, ACK when matching, and NACK when not matching. When the verification result B=ACK, the expected initial vector value update unit 1303 increments, by one, and outputs, to the expected initial vector value holding unit 1301, the initial vector expected values N*to the expected initial vector value holding unit 1301. In contrast, when the verification result B=NACK, the expected initial vector value update unit 1303 outputs the current initial vector expected values N* to the expected initial vector value holding unit 1301 without increment, and maintains the initial vector expected values N*.

Here, the update function f is typically an increment function f(N)=N+1. Note that a comparison and verification method may include, in the case of addressing information loss, such as packet loss on a communication path, determining the verification result B on the basis of not only verification of a match but also whether the difference in absolute value between N and N* is within that is a threshold t defined. In this case, the success probability of attackers performing falsification, in other words, the probability that the value of the initial vector N when unauthorized ciphertext is decrypted is a value close to N* coincidently, is approximately $t/2^n$. Hence, by setting t at a sufficiently small value, it is possible to detect falsification at a high probability while taking into account information loss.

(Plaintext Output Unit)

The plaintext output unit 1106 is the following functional component. The plaintext output unit 1106 inputs the exclusive OR of the pseudorandom number sequence V, which is the output by the pseudorandom number generation unit 1103, and the first part CR of the ciphertext C (all the blocks other than the leftmost block of the ciphertext C), as plaintext M, and the verification result B, which is output by the initial vector check unit 1105. Then, in the case of B=ACK that is a signal indicating permission of a plaintext output, the plaintext output unit 1106 outputs the plaintext M for verification success, to a computer display or printer, for example. In contrast, in the case of B=NACK that is a signal indicating stop of a plaintext output, the plaintext output unit 1106 outputs an error message for verification failure.

<<Hardware Configuration of Authenticated Decryption Unit>>

Figure 15:
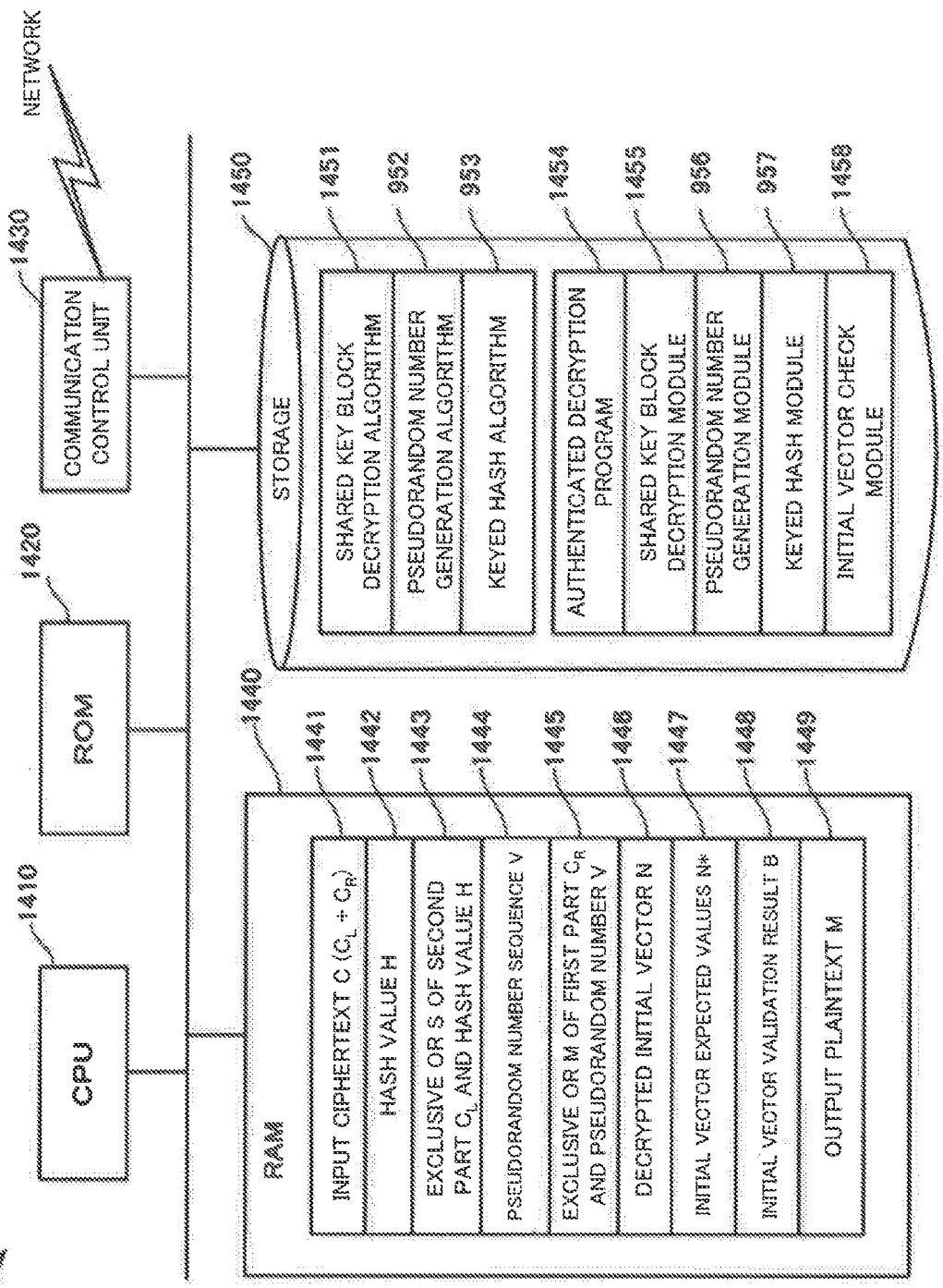
FIG. 15 is a block diagram illustrating a hardware configuration of the authenticated decryption unit according to the second example embodiment.

FIG. 15 is a block diagram illustrating a hardware configuration of the authenticated decryption unit 220 according to the present example embodiment.

In FIG. 15, a CPU 1410 is a processor for operation control, and achieves the functional components in FIG. 12 by executing a program. A ROM 1420 stores fixed data, such as initial data and a program. A communication control unit 1430 communicates with a different device via a network. Note that the CPU 1410 is not limited to one, may be a plurality of CPUs, and may include a GPU for image processing. Moreover, the communication control unit 1430 preferably includes a CPU separate from the CPU 1410 to write or read reception/transmission data to or from an area in a RAM 1440. It is also preferable that a DMAC that transfers data between the RAM 1440 and storage 1450 be provided (not illustrated). With this configuration, the CPU 1410 recognizes that data is received at or transferred to the RAM 1440 and processes the data. Moreover, the CPU 1410 prepares a processing result in the RAM 1440 and lets the communication control unit 1430 and the DMAC be in charge of subsequent transmission or transfer.

The RAM 1440 is a random access memory used by the CPU 1410 as a temporary storage work area. An area storing data necessary for implementing the present example embodiment is reserved in the RAM 1440. Input ciphertext C 1441 is ciphertext on which the authenticated decryption unit 220 performs authenticated decryption. The input ciphertext C 1441 is separated into the second part (leftmost block) CL and the first part (blocks other than the leftmost block) CR, and is read out. The hash value H 1442 is a hash value generated on the basis of the first part CR of the ciphertext. An exclusive OR S 1443 of the second part CL and the hash value H is data corresponding to the encrypted initial vector. A pseudorandom number sequence V 1444 is a pseudorandom number generated on the basis of the exclusive OR S 1443. An exclusive OR M 1445 of the first part CR and the pseudorandom number V is a decrypted plaintext candidate. A decrypted initial vector N 1446 is an initial vector N obtained by performing shared key block decryption on the exclusive OR S 1443. Initial vector expected values N* 1447 is an expected value of the initial vector decrypted on the input ciphertext C 1441. An initial vector verification result B 1448 is a verification result indicating whether the decrypted initial vector N 1446 and the initial vector expected values N* 1447 match. An output plaintext M 1449 is plaintext that is output when the initial vector verification result B 1448 indicates a match (ACK).

The storage 1450 stores databases and various parameters, or the following data or program necessary for achieving the present example embodiment. A shared key block decryption algorithm 1451 is a shared key block decryption algorithm used in the present example embodiment. A pseudorandom number generation algorithm 952 is a pseudorandom number generation algorithm used in the present example embodiment, and is the same as that in the authenticated encryption unit 210. A keyed hash algorithm 953 is a keyed algorithm used in the present example embodiment, and is the same as that in the authenticated encryption unit 210. The storage 1450 stores the following program. An authenticated encryption program 1454 is a program of controlling the entire authenticated encryption process. A shared key block encryption module 1455 is a module that performs shared key block decryption in accordance with the shared key block decryption algorithm 1451. A pseudorandom number generation module 956 is a module that performs pseudorandom number generation in accordance with the pseudorandom number generation algorithm 952, and is the same as that in the authenticated encryption unit 210. A keyed hash module 957 is a module that performs keyed hash generation in accordance with the keyed hash algorithm 953, and is the same as that in the authenticated encryption unit 210. An initial vector check module 1458 is a module that compares the initial vector decrypted from the ciphertext and the initial vector expected values and performs processing which depends on whether or not the initial vector and the expected value match.

Programs and data associated with general-purpose functions or other achievable functions of the authenticated decryption unit 220 are not illustrated in the RAM 1440 and storage 1450 in FIG. 15. Moreover, programs and data associated with general functions or other achievable functions of the information processing device including the authenticated decryption unit 220 are not illustrated either.

<<Operation Procedure of Authenticated Decryption Unit>>

Figure 16:
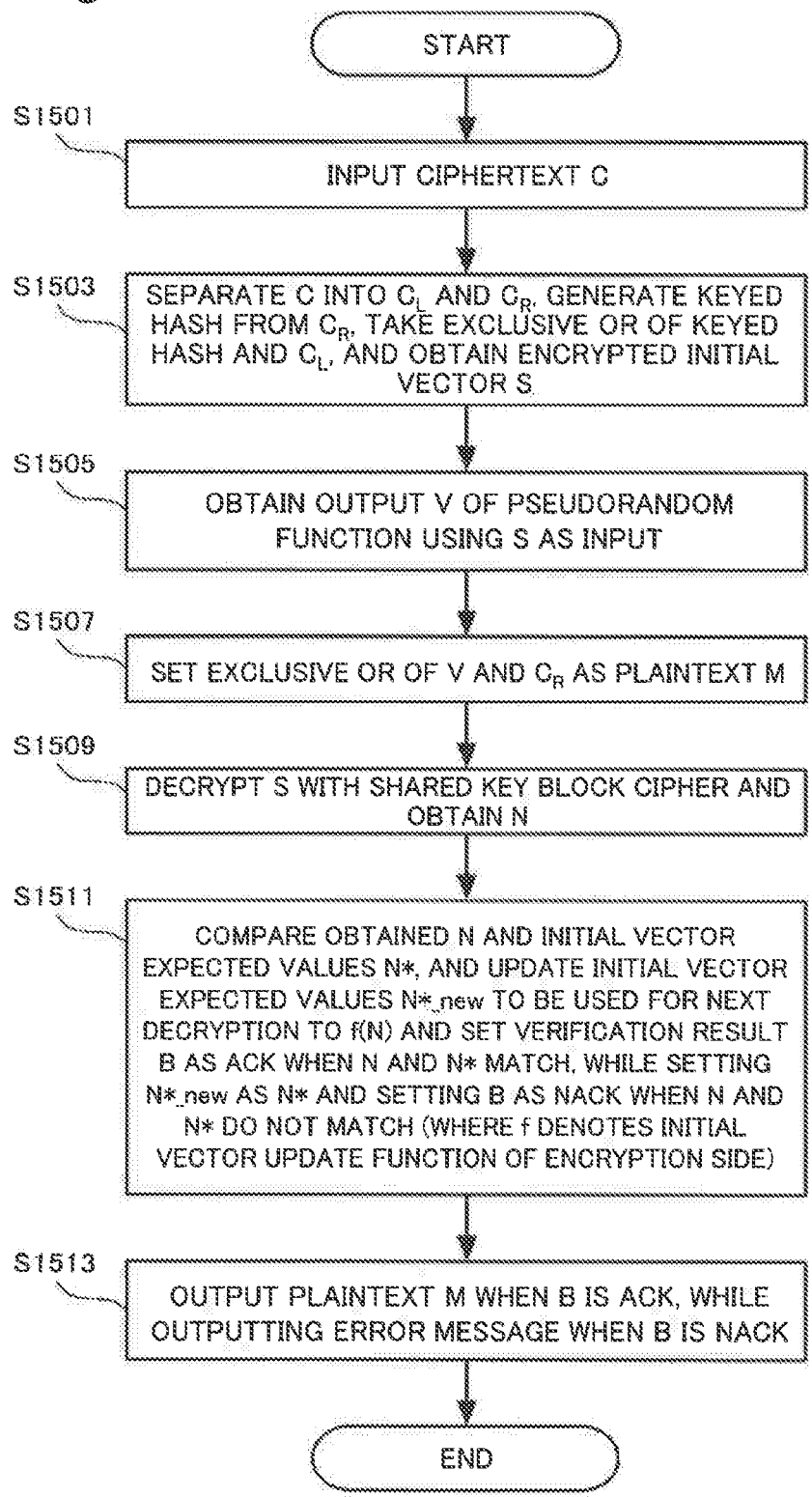
FIG. 16 is a flowchart illustrating an operation procedure of the authenticated decryption unit according to the second example embodiment.

FIG. 16 is a flowchart illustrating an operation procedure of the authenticated decryption unit 220 according to the present example embodiment. This flowchart is practiced by the CPU 1410 in FIG. 15 by using the RAM 1440 to achieve the functional components in FIG. 12. Note that the operation order of the authenticated encryption is not limited to that in FIG. 16.

In Step S1501, the authenticated decryption unit 220 inputs ciphertext C which is a target. Then, in Step S1503, the authenticated decryption unit 220 separates the ciphertext C into a second part (leftmost block) CL and a first part (all the blocks other than the leftmost block) CR. Then, the authenticated decryption unit 220 generates a keyed hash from the first part CR, takes the exclusive OR of the obtained one-block hash value H and the second part CL, and obtains an encrypted initial vector S. Then, in Step S1505, the authenticated decryption unit 220 obtains a pseudorandom number sequence V, which is an output of a pseudorandom function with the encrypted initial vector S as an input.

Next, in Step S1507, the authenticated decryption unit 220 sets the exclusive OR of the pseudorandom number sequence V and the first part CR as a candidate for the plaintext M that is a decryption result. Then, in Step S1509, the authenticated decryption unit 220 performs shared key block decryption on the encrypted initial vector S, and obtains through decryption an initial vector N that has the same length.

Next, in Step S1511, the authenticated decryption unit 220 compares the initial vector N decrypted from the ciphertext C and the initial vector expected values N*. According to the comparison result, when N and N* match, the authenticated decryption unit 220 updates the initial vector expected values N*new to be used for the next decryption to f(N) by the use of the initial vector update function f of the encryption side, and sets the verification result B=ACK. In contrast, in the case of no match, the authenticated decryption unit 220 maintains N* as N*new, and sets B=NACK. Lastly, in Step S1513, the authenticated decryption unit 220 outputs the decrypted plaintext M when the verification result B=ACK, and outputs an error message indicating verification being failed when B=NACK.

In the above present example embodiment, the authenticated encryption unit 210 and the authenticated decryption unit 220 are described independently. In the case of the information processing device 204 including both the authenticated encryption unit 210 and the authenticated decryption unit 220 in FIG. 2, the pseudorandom number generation unit (pseudorandom number generation module) and the keyed hash unit (keyed hash module) can be shared for encryption and decryption. Furthermore, in the case of the Feistel structure, the shared key block encryption unit (shared key block encryption module) and the shared key block decryption unit (shared key block decryption module) can be shared for encryption and decryption. In addition, the functional configuration of performing exclusive OR can also be shared as a conversion unit that converts plaintext and the first part of ciphertext mutually or as a conversion unit that converts an encrypted initial vector and the second part of ciphertext mutually.

According to the present example embodiment, it is possible to efficiently enable authenticated encryption with a small increase of a band (length) of ciphertext with respect to plaintext by performing block encryption once and finite field GF ($2^n$) multiplication once, or block encryption twice, per input block.

Specifically, in the present example embodiment, the initial vector N and plaintext M are combined as in the AERO described in NPL 1, and encryption in the XBC mode called WPRP described in PTL 1 is performed. This enables a process for the combination of the tag T and the initial vector N, and allows the band to be increased only for the initial vector N. However, in this scheme, block encryption needs to be performed once and finite field GF ($2^n$) multiplication (where n denotes block size) needs to be performed twice, per input block, and hence the efficiency is low. This low efficiency is mainly attributable to the fact that, in WPRP, the entire decryption result is set to be an unpredictable computational random number for ciphertext created by an attacker. In the present example embodiment, only the part corresponding to the initial vector to be used for verification in the decryption result is set to be an unpredictable computational random number, and moderates the condition for decryption. Consequently, in the present example embodiment, it is possible to perform, per input block, block encryption once and finite field GF ($2^n$) multiplication once, or block encryption twice. In other words, in the present example embodiment, block encryption is performed twice per input block by combining block encryption once in the pseudorandom number generation unit and finite field GF ($2^n$) multiplication once in the keyed hash unit, or by combining block encryption once in the pseudorandom number generation unit and block encryption once in the keyed hash unit. In this way, computation efficiency is improved to be maintained at approximately the same level as the case of Document CCM and Document GCM using normal type of authenticated encryption, although the band is reduced.

Third Example Embodiment

Next, an authenticated encryption system according to a third example embodiment of the present invention is described. The authenticated encryption system according to the present example embodiment is different from the above-described second example embodiment in that the authenticated encryption system includes an information processing device that performs authenticated encryption in a different procedure, an information processing device that performs authenticated decryption in a different procedure, or an information processing device that performs authenticated encryption and authenticated decryption in different procedures. The other components and operations are the same as those in the second example embodiment, and hence the same components and operations are denoted by the same reference signs and detailed description thereof is omitted.

<<Functional Configuration of Authenticated Encryption Unit>>

Figure 17:
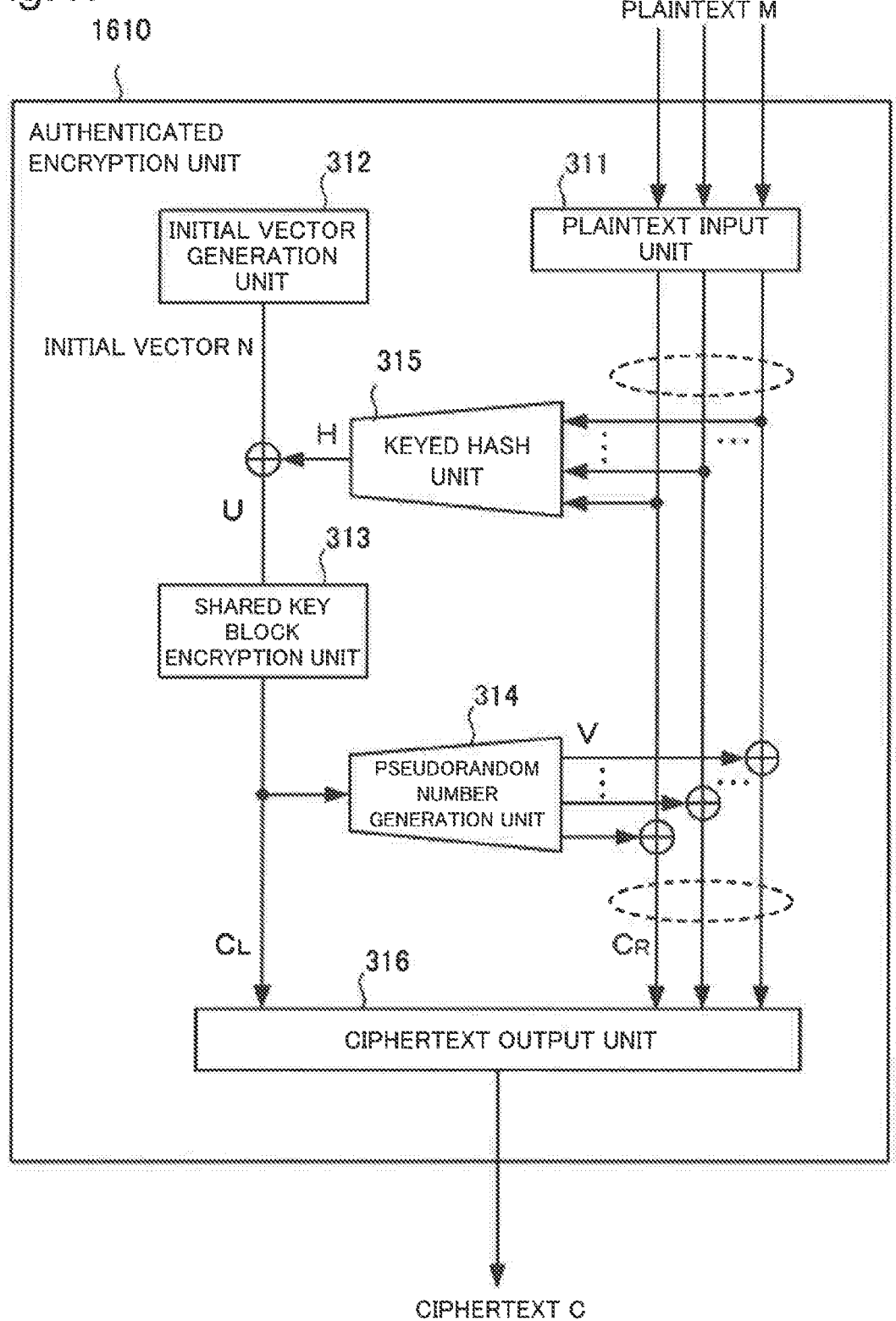
FIG. 17 is a block diagram illustrating a functional configuration of an authenticated encryption unit as an information processing device according to a third example embodiment of the present invention.

FIG. 17 is a block diagram illustrating a functional configuration of an authenticated encryption unit 1610 as an information processing device according to the present example embodiment. In FIG. 17, the same functional components as those in FIG. 3 are denoted by the same reference signs, and description thereof is omitted.

As can be seen from the comparison between FIG. 17 and FIG. 3, the functions of the functional components are the same in FIG. 17 and FIG. 3 with the only difference in the connection of the functional components. Specifically, the authenticated encryption unit 1610 includes a plaintext input unit 311, an initial vector generation unit 312, a shared key block encryption unit 313, a pseudorandom number generation unit 314, a keyed hash unit 315, and a ciphertext output unit 316.

Due to the difference in connection of the functional components, input data and output data of the functional components in FIG. 17 are different from input data and output data of the functional components in FIG. 3. However, since the roles are the same, the same reference signs are used for common input data and output data. Operations of the authenticated encryption unit 1610 are described below.

First, the plaintext input unit 311 inputs the plaintext M. Then, the keyed hash unit 315 outputs a hash value H using the plaintext M as an input. A second part (leftmost block of ciphertext) CL of the ciphertext is obtained by encrypting, by the shared key block encryption unit 313, a masked initial vector U obtained by taking the exclusive OR of the hash value H and an initial vector N output by the initial vector generation unit 312. Then, the pseudorandom number generation unit 314 outputs the pseudorandom number sequence V by using the second part CL as an input. Then, the exclusive OR of the pseudorandom number sequence V and the plaintext M is taken, and a first part (blocks other than the leftmost block of the ciphertext) of the ciphertext is obtained. The ciphertext output unit 316 forms ciphertext C by combining the second part CL and the first part CR, and outputs the ciphertext C to a computer display or printer, for example. Additionally, writing to a storage medium and transmission via a communication medium may be performed.

<<Operation Procedure of Authenticated Encryption Unit>>

Figure 18:
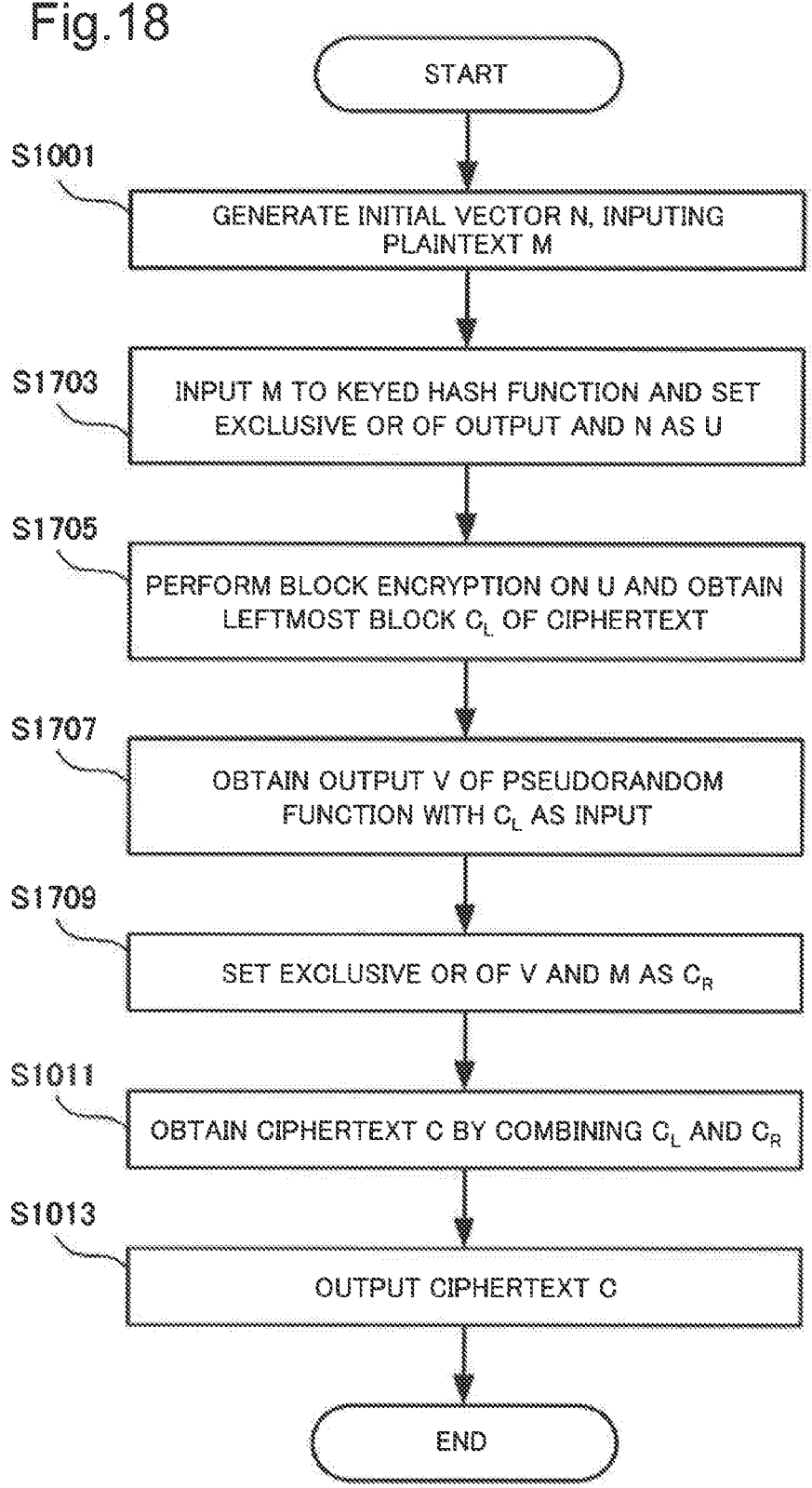
FIG. 18 is a flowchart illustrating an operation procedure of the authenticated encryption unit according to the third example embodiment.

FIG. 18 is a flowchart illustrating an operation procedure of the authenticated encryption unit 1610 according to the present example embodiment. The CPU 910 in FIG. 10 operates according to this flowchart by using the RAM 940, and achieves the functional components in FIG. 17. In FIG. 18, the same steps as those in FIG. 11 are denoted by the same step numbers, and description thereof is omitted. In addition, the operation order of the authenticated encryption is not limited to that in FIG. 18.

In Step S1703, the authenticated encryption unit 1610 generates a keyed hash value H from plaintext M, and takes the exclusive OR of the obtained one-block keyed hash value H and an initial vector N into a masked initial vector U. Then, in Step S1705, the authenticated encryption unit 1610 performs shared key block encryption on the masked initial vector U, and obtains a second part (leftmost block) CL of ciphertext. Then, in Step S1707, the authenticated encryption unit 1610 obtains a pseudorandom number sequence V by using the second part CL as an input. Then, in Step S1709, the authenticated encryption unit 1610 takes the exclusive OR of the pseudorandom number sequence V and the plaintext M into a first part (blocks other than the leftmost block) CR of the ciphertext.

<<Functional Configuration of Authenticated Decryption Unit>>

Figure 19:
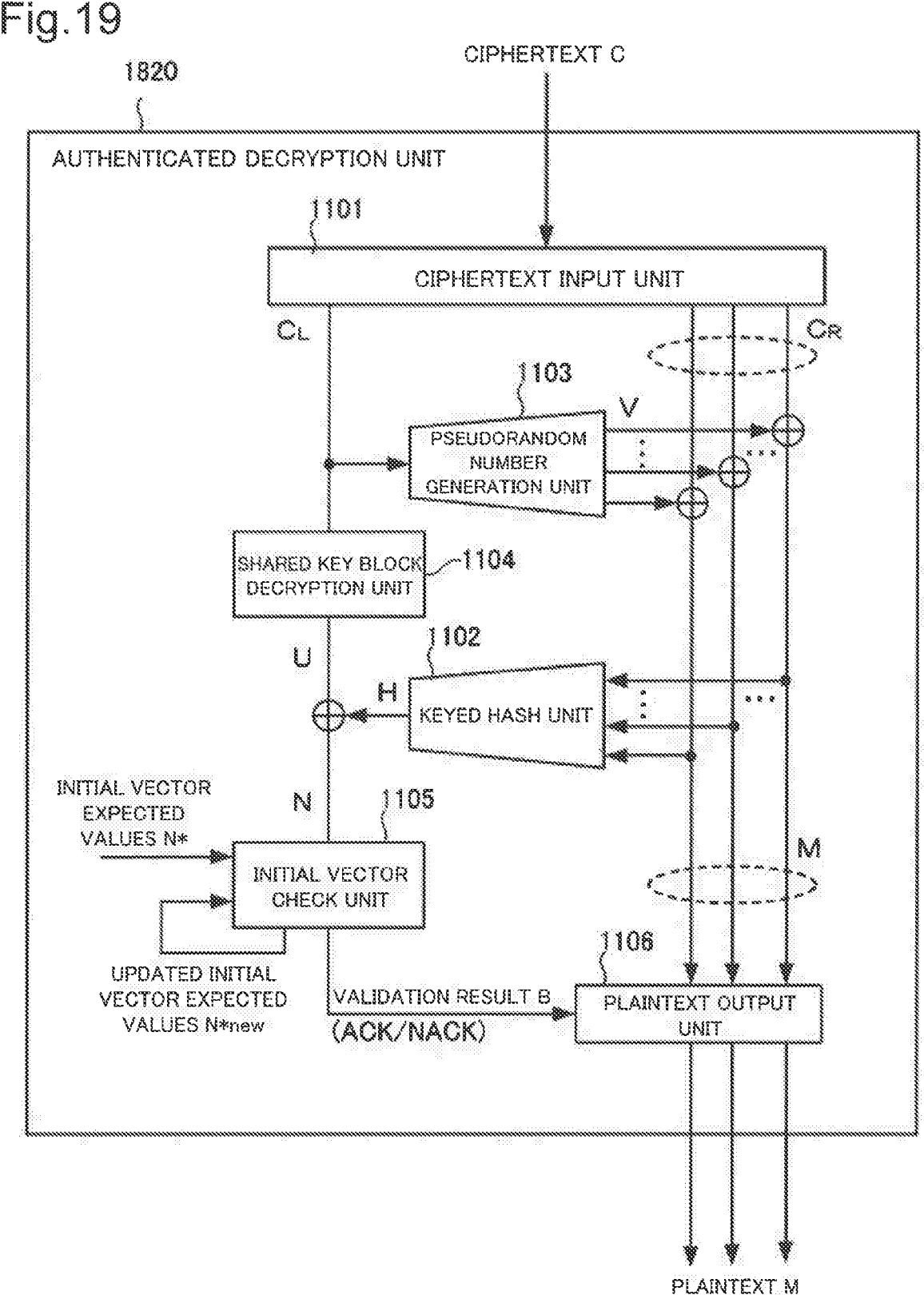
FIG. 19 is a block diagram illustrating a functional configuration of an authenticated decryption unit as an information processing device according to the third example embodiment.

FIG. 19 is a block diagram illustrating a functional configuration of an authenticated encryption unit 1820 as an information processing device according to the present example embodiment. In FIG. 19, the same functional components as those in FIG. 12 are denoted by the same reference signs, and description thereof is omitted.

As can be seen from the comparison between FIG. 19 and FIG. 12, the functions of the functional components are the same in FIG. 19 and FIG. 12 with the only difference in the connection of the functional components. Specifically, the authenticated decryption unit 1820 includes a ciphertext input unit 1101, a keyed hash unit 1102, a pseudorandom number generation unit 1103, a shared key block decryption unit 1104, an initial vector check unit 1105, and a plaintext output unit 1106.

Due to the difference in connection of the functional components, input data and output data of the functional components in FIG. 19 are different from input data and output data of the functional components in FIG. 12. However, since the roles are the same, the same reference signs are used for common input data and output data. Operations of the authenticated encryption unit 1820 are described below.

First, ciphertext C is input to the ciphertext input unit 1101, and is separated into and is output as a second part (leftmost block) CL and a first part (all the blocks other than the leftmost block) CR of the ciphertext C. The pseudorandom number generation unit 1103 outputs a pseudorandom number sequence V by using the second part CL as an input. Then, exclusive OR is performed on the pseudorandom number sequence V and the first part CR, which is set as a candidate for the plaintext M.

The keyed hash unit 1102 outputs a hash value H by using the plaintext M as an input. The shared key block decryption unit 1104 outputs the result of decrypting the second part CL, as the masked initial vector U. Then, the decrypted initial vector N is obtained by taking the exclusive OR of the masked initial vector U and the hash value H. Then, the initial vector check unit 1105 compares the initial vector expected values N* and the decrypted initial vector N, and outputs the updated initial vector expected values N*new and a binary verification result B (ACK or NACK) according to the comparison result. Lastly, the plaintext output unit 1106 outputs the plaintext M when B=ACK and an error message when B=NACK to, for example, a computer display or a printer by the use of the verification result B and the candidate for the plaintext M.

<<Operation Procedure of Authenticated Decryption Unit>>

FIG. 20 is a flowchart illustrating an operation procedure of the authenticated decryption unit 1820 according to the present example embodiment. The CPU 1410 in FIG. 15 operates according to this flowchart by using the RAM 1440, and achieves the functional components in FIG. 19. In FIG. 20, substantially the same steps as those in FIG. 16 are denoted by the same step numbers, and description thereof is omitted. Moreover, the operation order of the authenticated decryption is not limited to that in FIG. 20.

In Step S1903, the authenticated decryption unit 1820 separates input ciphertext C into a second part (leftmost block) CL and a first part (all the blocks other than the leftmost block) CR, and obtains a pseudorandom number sequence V using the second part CL as an input. Then, in Step S1905, the authenticated decryption unit 1820 takes the exclusive OR of the pseudorandom number sequence V and the first part CR, and set it as a candidate for the plaintext M of a decryption result. Then, in Step S1907, the authenticated decryption unit 1820 generates a keyed hash value H from the candidate for the plaintext M. Then, in Step S1909, the authenticated decryption unit 1820 takes the exclusive OR of the masked initial vector U obtained by performing shared key block decryption on the second part CL and the hash value H into the decrypted initial vector N.

Note that, although authenticated coding and authenticated decryption are described separately in the above-described example embodiment, there are also bidirectional information processing devices, which perform both authenticated coding and authenticated decryption, as illustrated in FIG. 2. In this case, components and modules that can be shared for authenticated coding and authenticated decryption do not need to be included redundantly.

According to the present example embodiment, it is possible to efficiently enable authenticated encryption with a small increase of a band (length) of ciphertext with respect to plaintext by performing block encryption once and finite field GF ($2^n$) multiplication once, or block encryption twice, per input block. In addition, even when the initial vector is mistakenly determined to be the same value as a value used in the past, it is possible to prevent information leakage.

In other words, in the above-described second example embodiment, it is possible in some cases to compute the variable-length-input/fixed-length-output function used in the keyed hash unit, by using an internal state of n bits as in "CMAC" in Document CMAC and "Poly1305" in Document Poly, for example. In such a case, even when the blocks of plaintext is sequentially input in encryption, processing can be performed sequentially when there is a buffer for several blocks, which is efficient in terms of memory capacity.

In the present example embodiment, although such characteristics are not included, it is possible to prevent information leakage instead, because the entire ciphertext looks random for attackers even when an initial vector is mistakenly the same as a value used in the past in the encryption. However, since the decryption side considers such a situation as replay, it is necessary to set the initial vector correctly and then retransmit the initial vector.

Other Example Embodiments

The present invention is applicable also to uses such as encryption and message authentication in wireless or wired data communication and protection for communication between a wireless sensor device and an information collection server.

Although the present invention is described with reference to the example embodiments, the present invention is not limited to the above-described example embodiments. Various changes that can be understood by those skilled in the art within the scope of the present invention can be made to the configurations and details of the present invention. Moreover, a system or a device configured by combining, in any way, the different features of the example embodiments is also included in the scope of the present invention.

Moreover, the present invention may be applied to a system implemented with a plurality of devices or may be applied to a single device. Further, the present invention is also applicable to a case where a control program that achieves the functions of the example embodiments is provided directly or remotely to a system or a device. Hence, a program to be installed in a computer in order to achieve the functions of the present invention by the use of the computer, a medium storing the program, and a world wide web (www) server that causes the program to be downloaded are also included in the scope of the present invention. In particular, a non-transitory computer readable medium storing a program that causes a computer to execute the processing steps included in the above-described example embodiments is at least included in the scope of the present invention.

Other Representations of Example Embodiments

Some of or all the above-described example embodiments can be described as in the following supplementary notes, although not limited thereto.

(Supplementary Note 1) An information processing device according to an exemplary aspect of the present invention including:

plaintext input means for inputting plaintext;

initial vector generation means for generating an initial vector;

shared key block encryption means for generating an encrypted initial vector by performing shared key block encryption on the initial vector;

pseudorandom number generation means for generating a pseudorandom number sequence having same length as the plaintext has using the encrypted initial vector as an input;

keyed hash means for generating a hash value using, as an input, a first part of ciphertext obtained by taking an exclusive OR of the pseudorandom number sequence and the plaintext; and ciphertext output means for combining and outputting, as ciphertext, a second part of the ciphertext obtained by taking an exclusive OR of the hash value and the encrypted initial vector and the first part.

(Supplementary Note 2) The information processing device according to Supplementary Note 1, wherein the initial vector generation means generates the initial vector value so as to be different from any past value, by generating an arbitrary fixed value first and generating, for the second time and thereafter, a value obtained by adding one to the initial vector value most recently generated.

(Supplementary Note 3) The information processing device according to Supplementary Note 1 or 2, wherein the shared key block encryption means encrypts the initial vector of one block according to a shared key block cipher encryption function, and outputs an encrypted initial vector having same length as the initial vector has.

(Supplementary Note 4) The information processing device according to any one of Supplementary Notes 1 to 3, wherein the pseudorandom number generation means generates the pseudorandom number sequence having same length as the plaintext has, by using the encrypted initial vector of one block, according to a fixed-length-input/variable-length-output pseudorandom function in a modified counter mode or a modified OFB mode.

(Supplementary Note 5) The information processing device according to any one of Supplementary Notes 1 to 4, wherein the keyed hash means outputs the hash value using the first part as an input by a cipher-based message authentication code (CMAC) algorithm using a block cipher or a method of combining a polynomial hash over a finite field and block cipher encryption.

(Supplementary Note 6) A non-transitory computer readable storage medium according to an exemplary aspect of the present invention stores an information processing device control program causing a computer to execute:
a plaintext input step of inputting plaintext;
an initial vector generation step of generating an initial vector;
a shared key block encryption step of generating an encrypted initial vector by performing shared key block encryption on the initial vector;
a pseudorandom number generation step of generating a pseudorandom number sequence having same length as the plaintext has using the encrypted initial vector as an input;
a keyed hash step of generating a hash value by using, as an input, a first part of ciphertext obtained by taking an exclusive OR of the pseudorandom number sequence and the plaintext; and
a ciphertext output step of combining and outputting, as ciphertext, a second part of the ciphertext obtained by taking an exclusive OR of the hash value and the encrypted initial vector and the first part.

(Supplementary Note 7) An information processing device according to an exemplary aspect of the present invention includes:
plaintext input means for inputting plaintext;
initial vector generation means for generating an initial vector;
keyed hash means for generating a hash value using the plaintext as an input;
shared key block encryption means for generating a second part of ciphertext by performing shared key block encryption on a masked initial vector obtained by taking an exclusive OR of the initial vector and the hash value;
pseudorandom number generation means for generating a pseudorandom number sequence having same length as the plaintext has using the second part as an input; and
ciphertext output means for combining and outputting, as ciphertext, a first part of the ciphertext obtained by taking an exclusive OR of the pseudorandom number sequence and the plaintext and the second part.

(Supplementary Note 8) The information processing device according to Supplementary Note 7, wherein the initial vector generation means generates the initial vector value so as to be different from any past value, by generating an arbitrary fixed value first and generating, for the second time and thereafter, a value obtained by adding one to the initial vector value most recently generated.

(Supplementary Note 9) The information processing device according to Supplementary Note 7 or 8, wherein the keyed hash means outputs the hash value using the plaintext as an input by a cipher-based message authentication code (CMAC) algorithm using a block cipher or a method of combining a polynomial hash over a finite field and block cipher encryption.

(Supplementary Note 10) The information processing device according to any one of Supplementary Notes 7 to 9, wherein the shared key block encryption means encrypts the masked initial vector according to a shared block cipher encryption function, and outputs the second part.

(Supplementary Note 11) The information processing device according to any one of Supplementary Notes 7 to 10, wherein the pseudorandom number generation means generates the pseudorandom number sequence having same length as the plaintext has, by using the second part, according to a fixed-length-input/variable-length-output pseudorandom function in a modified counter mode or a modified OFB mode.

(Supplementary Note 12) A non-transitory computer readable storage medium according to an exemplary aspect of the present invention stores an information processing device control program causing a computer to execute:
a plaintext input step of inputting plaintext;
an initial vector generation step of generating an initial vector;
a keyed hash step for generating a hash value using the plaintext as an input;
a shared key block encryption step of generating a second part of ciphertext by performing shared key block encryption on a masked initial vector obtained by taking an exclusive OR of the initial vector and the hash value;
a pseudorandom number generation step of generating a pseudorandom number sequence having same length as the plaintext has using the second part as an input; and
a ciphertext output step of combining and outputting, as ciphertext, a first part of the ciphertext obtained by taking an exclusive OR of the pseudorandom number sequence and the plaintext and the second part.

(Supplementary Note 13) An information processing device according to an exemplary aspect of the present invention includes:
ciphertext input means for inputting ciphertext, separating the ciphertext into a first part and a second part, and outputting the first part and the second part;
keyed hash means for generating a hash value using the first part as an input;
pseudorandom number generation means for generating a pseudorandom number sequence having same length as the first part has using, as an input, an encryption initial vector obtained by taking an exclusive OR of the hash value and the second part of the ciphertext;
shared key block decryption means for generating an initial vector by performing shared key block decryption on the encrypted initial vector;
initial vector check means for inputting the decrypted initial vector and initial vector expected values, and checking whether the decrypted initial vector and the initial vector expected values match; and
plaintext output means for outputting plaintext obtained by taking an exclusive OR of the pseudorandom number sequence and the first part when the decrypted initial vector and the initial vector expected values match.

(Supplementary Note 14) The information processing device according to Supplementary Note 13, wherein the second part is a single block at an end of the ciphertext, and the first part is a remaining block of the ciphertext.

(Supplementary Note 15) The information processing device according to Supplementary Note 13 or 14, wherein
the initial vector check means
outputs a signal of permitting an output of the plaintext, and updates the initial vector expected values to a value expected for next ciphertext, when the decrypted initial value and the initial vector expected values match, and
outputs a signal of stopping an output of the plaintext, and maintains the initial vector expected values, when the decrypted initial vector and the initial vector expected values do not match, and
the plaintext output means outputs the plaintext upon receipt of the signal of permitting, and outputs an error message upon receipt of the signal of stopping.

(Supplementary Note 16) A non-transitory computer readable storage medium according to an exemplary aspect of the present invention stores an information processing device control program causing a computer to execute:
a ciphertext input step of inputting ciphertext, separating the ciphertext into a first part and a second part, and outputting the first part and the second part;
a keyed hash step of generating a hash value using the first part as an input;
a pseudorandom number generation step of generating a pseudorandom number sequence having same length as the first part has using, as an input, an encryption initial vector obtained by taking an exclusive OR of the hash value and the second part;
a shared key block decryption step of generating an initial vector by performing shared key block decryption on the encrypted initial vector;
an initial vector check step of inputting the generated initial vector and initial vector expected values, and checking whether the decrypted initial vector and the initial vector expected values match; and
a plaintext output step of outputting plaintext obtained by taking an exclusive OR of the pseudorandom number sequence and the first part when the decrypted initial vector and the initial vector expected values match.

(Supplementary Note 17) An information processing device according to an exemplary aspect of the present invention includes:
ciphertext input means for inputting ciphertext, separating the ciphertext into a first part and a second part, and outputting the first part and the second part;
pseudorandom number generation means for generating a pseudorandom number sequence having same length as the first part has using the second part as an input;
shared key block decryption means for generating a masked initial vector by performing shared key block decryption on the second part;
keyed hash means for generating a hash value using, as an input, plaintext obtained by taking an exclusive OR of the pseudorandom number sequence and the first part;
initial vector check means for inputting a decrypted initial vector obtained by taking an exclusive OR of the hash value and the masked initial vector and initial vector expected values, and checking whether the decrypted initial vector and the initial vector expected values match; and
plaintext output means for outputting the plaintext when the decrypted initial vector and the initial vector expected values match.

(Supplementary Note 18) The information processing device according to Supplementary Note 17, wherein the second part is a single block at an end of the ciphertext, and the first part is a remaining block of the ciphertext.

(Supplementary Note 19) The information processing device according to Supplementary Note 17, wherein
the initial vector check means
outputs a signal of permitting an output of the plaintext, and updates the initial vector expected values to a value expected for next ciphertext, when the decrypted initial value and the initial vector expected values match, and
outputs a signal of stopping an output of the plaintext, and maintains the initial vector expected values, when the decrypted initial vector and the initial vector expected values do not match, and
the plaintext output means outputs the plaintext upon receipt of the signal of permitting, and outputs an error message upon receipt of the signal of stopping.

(Supplementary Note 20) A non-transitory computer readable storage medium according to an exemplary aspect of the present invention stores an information processing device control program causing a computer to execute:
a ciphertext input step of inputting ciphertext, separating the ciphertext into a first part and a second part, and outputting the first part and the second part;
a pseudorandom number generation step of generating a pseudorandom number sequence having same length as the first part has using the second part as an input;
a shared key block decryption step of generating a masked initial vector by performing shared key block decryption on the second part;
a keyed hash step of generating a hash value using, as an input, plaintext obtained by taking an exclusive OR of the pseudorandom number sequence and the first part;
an initial vector check step of inputting a decrypted initial vector obtained by taking an exclusive OR of the hash value and the masked initial vector and initial vector expected values, and checking whether the decrypted initial vector and the initial vector expected values match; and
a plaintext output step of outputting the plaintext when the decrypted initial vector and the initial vector expected values match.

(Supplementary Note 21) An information processing device including:
shared key block encryption means for generating an encrypted initial vector by performing shared key block encryption on an initial vector;
shared key block decryption means for generating an initial vector by performing block decryption on the encrypted initial vector;
pseudorandom number generation means for generating a pseudorandom number sequence having same length as plaintext has, using, as an input, the encrypted initial vector which is encrypted;
first conversion means for mutually converting between the plaintext and a first part of ciphertext by using an exclusive OR with the pseudorandom number sequence;
keyed hash means for generating a hash value using part of the ciphertext as an input; and
second conversion means for mutually converting between the encrypted initial vector and a second part of the ciphertext by using an exclusive OR with the hash value,
wherein the information processing device executes:
encryption processing of combining and outputting, as ciphertext, a second part of the ciphertext obtained by taking the exclusive OR of the encrypted initial vector and the hash value and the first part of the ciphertext obtained by taking the exclusive OR of the input plaintext and the pseudorandom number sequence; and decryption processing of separating the ciphertext, which is input, into the first part of the ciphertext and the second part of the ciphertext, generating an initial vector by performing block decryption on the encrypted initial vector obtained by taking the exclusive OR of the second part of the ciphertext and the hash value, and taking and outputting, as plaintext, the exclusive OR of the first part of the ciphertext and the pseudorandom number sequence.

(Supplementary Note 22) An authenticated encryption system including an authenticated encryption device and an authenticated decryption device, wherein the authenticated encryption device includes:

plaintext input means for inputting plaintext;

initial vector generation means for generating an initial vector;

shared key block encryption means for generating an encrypted initial vector by performing shared key block encryption on the initial vector;

pseudorandom number generation means for generating a pseudorandom number sequence having same length as the plaintext has using the encrypted initial vector as an input;

keyed hash means for generating a hash value using, as an input, a first part of ciphertext obtained by taking an exclusive OR of the pseudorandom number sequence and the plaintext; and ciphertext output means for combining and outputting, as ciphertext, a second part of the ciphertext obtained by taking an exclusive OR of the hash value and the encrypted initial vector and the first part, and the authenticated decryption device includes:

ciphertext input means for inputting ciphertext, separating the ciphertext into a first part and a second part, and outputting the first part and the second part;

keyed hash means for generating a hash value using the first part as an input;

pseudorandom number generation means for generating a pseudorandom number sequence having same length as the first part has using, as an input, an encryption initial vector obtained by taking an exclusive OR of the hash value and the second part of the ciphertext;

shared key block decryption means for generating an initial vector by performing shared key block decryption on the encrypted initial vector;

initial vector check means for inputting the decrypted initial vector and initial vector expected values, and checking whether the decrypted initial vector and the initial vector expected values match; and plaintext output means for outputting plaintext obtained by taking an exclusive OR of the pseudorandom number sequence and the first part when the decrypted initial vector and the initial vector expected values match.

(Supplementary Note 23) An authenticated encryption system including an authenticated encryption device and an authenticated decryption device, wherein the authenticated encryption device includes:

plaintext input means for inputting plaintext;

initial vector generation means for generating an initial vector;

keyed hash means for generating a hash value using the plaintext as an input;

shared key block encryption means for generating a second part of ciphertext by performing shared key block encryption on a masked initial vector obtained by taking an exclusive OR of the initial vector and the hash value;

pseudorandom number generation means for generating a pseudorandom number sequence having same length as the plaintext has using the second part as an input; and ciphertext output means for combining and outputting, as ciphertext, a first part of the ciphertext obtained by taking an exclusive OR of the pseudorandom number sequence and the plaintext and the second part, and the authenticated decryption device includes:

ciphertext input means for inputting ciphertext, separating the ciphertext into a first part and a second part, and outputting the first part and the second part;

pseudorandom number generation means for generating a pseudorandom number sequence having same length as the first part has using the second part as an input;

shared key block decryption means for generating a masked initial vector by performing shared key block decryption on the second part;

keyed hash means for generating a hash value using, as an input, plaintext obtained by taking an exclusive OR of the pseudorandom number sequence and the first part;

initial vector check means for inputting a decrypted initial vector obtained by taking an exclusive OR of the hash value and the masked initial vector and initial vector expected values, and checking whether the decrypted initial vector and the initial vector expected values match; and plaintext output means for outputting the plaintext when the decrypted initial vector and the initial vector expected values match.

(Supplementary Note 24) An authenticated encryption method according to an exemplary aspect of the present invention, which is an authenticated encryption method including generating ciphertext based on plaintext and an initial vector generated so as to be different from any past value, includes:

generating an encrypted initial vector by performing shared key block encryption based on the initial vector;

generating, based on the encrypted initial vector, a pseudorandom number an exclusive OR of which is to be taken with the plaintext, in order to generate a first part of the ciphertext from the plaintext; and generating, based on the plaintext, a keyed hash value an exclusive OR of which is to be taken with the initial vector, in addition to shared key block encryption of the initial vector in the generating the encrypted initial vector, in order to generate a second part of the ciphertext from the initial vector.

(Supplementary Note 25) An authenticated decryption method according to an exemplary aspect of the present invention, which an authenticated decryption method including decrypting, from ciphertext, plaintext on which the ciphertext is based and an initial vector used for generating the ciphertext, includes:

generating, in order to decrypt the plaintext from a first part of the ciphertext, a pseudorandom number an exclusive OR of which is to be taken with the first part, by using a second part of the ciphertext, performing shared key block decryption by using the second part of the ciphertext; and generating, by using the first part, a keyed hash value an exclusive OR of which is to be taken with the second part, in addition to shared key block decryption of the second part in the shared key block decryption, in order to decrypt the initial vector from the second part of the ciphertext.

(Supplementary Note 26) A non-transitory computer readable storage medium storing the control program according to any one of Supplementary Notes 6, 12, 16, and 20.

The invention of the present application is described above with reference to the example embodiments but is not intended to be limited to the above-described example embodiments. Various changes understood by those skilled in the art within the scope of the invention of the present application can be made to the configuration and details of the invention of the present application.

This application claims priority based on Japanese Patent Application No. 2014-167424 filed on Aug. 20, 2014, the entire disclosure of which is incorporated herein.

REFERENCE SIGNS LIST

100 Information processing device
200 Authenticated encryption system
204 Information processing device
210 Authenticated encryption unit
220 Authenticated decryption unit
311 Plaintext input unit
312 Initial vector generation unit
313 Shared key block encryption unit
314 Pseudorandom number generation unit
315 Keyed hash unit
316 Ciphertext output unit
401 Shared key encryption unit E
402 GHash
403 Counter mode encryption
404 GHash
405 Shared key decryption unit D
910 CPU
940 RAM
941 Input plaintext M
942 Initial vector N
943 Initial vector S
944 Pseudorandom number sequence V
945 Hash value H
950 Storage
951 Shared key block encryption algorithm
952 Pseudorandom number generation algorithm
953 Keyed hash algorithm
954 Authenticated encryption program
955 Shared key block encryption module
956 Pseudorandom number generation module
957 Keyed hash module
1101 Ciphertext input unit
1102 Keyed hash unit
1103 Pseudorandom number generation unit
1104 Shared key block decryption unit
1105 Initial vector check unit
1106 Plaintext output unit
1301 Expected initial vector value holding unit
1302 Initial vector comparison unit
1303 Expected initial vector value update unit
1410 CPU
1440 RAM
1441 Input ciphertext C
1442 Hash value H
1443 Exclusive OR S
1444 Pseudorandom number sequence V
1445 Exclusive OR M
1446 Initial vector N
1448 Initial vector verification result B
1449 Output plaintext M
1450 Storage
1451 Shared key block decryption algorithm
1454 Authenticated decryption program
1455 Shared key block decryption module
1458 Initial vector check module
1610 Authenticated encryption unit
1820 Authenticated decryption unit

The invention claimed is:

1. An information processing device comprising:
a memory that stores a set of instructions; and
at least one processor configured to execute the set of instructions to:
input plaintext;
generate an initial vector;
generate an encrypted initial vector by performing shared key block encryption on the initial vector;
generate a pseudorandom number sequence having same length as the plaintext has using the encrypted initial vector as an input;
generate a hash value using, as an input, a first part of ciphertext obtained by taking an exclusive OR of the pseudorandom number sequence and the plaintext; and
combine and output, as ciphertext, a second part of the ciphertext obtained by taking an exclusive OR of the hash value and the encrypted initial vector and the first part.

2. The information processing device according to claim 1, wherein the at least one processor is further configured to:
generate the initial vector value so as to be different from any past value, by generating an arbitrary fixed value first and generating, for the second time and thereafter, a value obtained by adding one to the initial vector value most recently generated.

3. The information processing device according to claim 1, wherein the at least one processor is further configured to:
encrypt the initial vector of one block according to a shared key block cipher encryption function, and output an encrypted initial vector having same length as the initial vector has.

4. The information processing device according to claim 1, wherein the at least one processor is further configured to:
generate the pseudorandom number sequence having same length as the plaintext has, by using the encrypted initial vector of one block, according to a fixed-length-input/variable-length-output pseudorandom function in a modified counter mode or a modified OFB mode.

5. The information processing device according to claim 1, wherein the at least one processor is further configured to:
output the hash value using the first part as an input by a cipher-based message authentication code (CMAC) algorithm using a block cipher or a method of combining a polynomial hash over a finite field and block cipher encryption.

6. An information processing device comprising:
a memory that stores a set of instructions; and
at least one processor configured to execute the set of instructions to:
input plaintext;
generate an initial vector;
generate a hash value using the plaintext as an input;
generate a second part of ciphertext by performing shared key block encryption on a masked initial vector obtained by taking an exclusive OR of the initial vector and the hash value;
generate a pseudorandom number sequence having same length as the plaintext has using the second part as an input; and
combine and output, as ciphertext, a first part of the ciphertext obtained by taking an exclusive OR of the pseudorandom number sequence and the plaintext and the second part.

7. The information processing device according to claim 6, wherein the at least one processor is further configured to:
generate the initial vector value so as to be different from any past value, by generating an arbitrary fixed value first and generating, for the second time and thereafter, a value obtained by adding one to the initial vector value most recently generated.

8. The information processing device according to claim 6, wherein the at least one processor is further configured to:
output the hash value using the plaintext as an input by a cipher-based message authentication code (CMAC) algorithm using a block cipher or a method of combining a polynomial hash over a finite field and block cipher encryption.

9. The information processing device according to claim 6, wherein the at least one processor is further configured to:
encrypt the masked initial vector according to a shared block cipher encryption function, and outputs the second part.

10. The information processing device according to claim 6, wherein the at least one processor is further configured to:
generate the pseudorandom number sequence having same length as the plaintext has, by using the second part, according to a fixed-length-input/variable-length-output pseudorandom function in a modified counter mode or a modified OFB mode.

11. An information processing device comprising:
a memory that stores a set of instructions; and
at least one processor configured to execute the set of instructions to:
input ciphertext, separate the ciphertext into a first part and a second part, and output the first part and the second part;
generate a hash value using the first part as an input;
generate a pseudorandom number sequence having same length as the first part has using, as an input, an encryption initial vector obtained by taking an exclusive OR of the hash value and the second part of the ciphertext;
generate an initial vector by performing shared key block decryption on the encrypted initial vector;
input the decrypted initial vector and initial vector expected values, and check whether the decrypted initial vector and the initial vector expected values match;
output plaintext obtained by taking an exclusive OR of the pseudorandom number sequence and the first part when the decrypted initial vector and the initial vector expected values match;
output a signal of permitting an output of the plaintext, and updates the initial vector expected values to a value expected for next ciphertext, when the decrypted initial value and the initial vector expected values match;
output a signal of stopping an output of the plaintext, and maintain the initial vector expected values, when the decrypted initial vector and the initial vector expected values do not match; and
output the plaintext upon receipt of the signal of permitting, and output an error message upon receipt of the signal of stopping.

12. The information processing device according to claim 11, wherein the second part is a single block at an end of the ciphertext, and the first part is a remaining block of the ciphertext.

* * * * *

UNITED STATES PATENT AND TRADEMARK OFFICE
CERTIFICATE OF CORRECTION

PATENT NO. : 10,623,176 B2
APPLICATION NO. : 15/504886
DATED : April 14, 2020
INVENTOR(S) : Kazuhiko Minematsu It is certified that error appears in the above-identified patent and that said Letters Patent is hereby corrected as shown below:

In the Drawings

Sheet 1 of 20, Fig. 1, Reference Numeral 116, Line 1; Delete "PHERTEXT" and insert --CIPHERTEXT-- therefor Signed and Sealed this
Fourteenth Day of July, 2020

Andrei Iancu
*Director of the United States Patent and Trademark Office*